(12) United States Patent
Koyama

(10) Patent No.: US 7,529,676 B2
(45) Date of Patent: May 5, 2009

(54) AUDIO DEVICE CONTROL DEVICE, AUDIO DEVICE CONTROL METHOD, AND PROGRAM

(75) Inventor: Rika Koyama, Hyogo (JP)

(73) Assignee: Kabushikikaisha Kenwood, Tokyo (JP)

( * ) Notice: Subject to any disclaimer, the term of this patent is extended or adjusted under 35 U.S.C. 154(b) by 0 days.

(21) Appl. No.: 10/581,823

(22) PCT Filed: Dec. 6, 2004

(86) PCT No.: PCT/IB2004/004007

§ 371 (c)(1),
(2), (4) Date: May 8, 2007

(87) PCT Pub. No.: WO2005/062293

PCT Pub. Date: Jul. 7, 2005

(65) Prior Publication Data

US 2007/0265844 A1 Nov. 15, 2007

(30) Foreign Application Priority Data

Dec. 5, 2003 (JP) ............................ 2003-406669

(51) Int. Cl.
*G10L 21/00* (2006.01)
(52) U.S. Cl. .................. 704/275; 704/231; 704/246; 704/270
(58) Field of Classification Search ................ 704/231, 704/275, 246, 270
See application file for complete search history.

(56) References Cited

U.S. PATENT DOCUMENTS 5,774,859 A 6/1998 Houser et al.

(Continued)

FOREIGN PATENT DOCUMENTS

EP 0911808 4/1999

(Continued)

OTHER PUBLICATIONS

Evans "Solving Home Automation Problems Using Artificial Intelligence Techniques" IEEE Transactions On Consumer Electronics, IEEE Service Center, New York, NY, US, vol. 37, No. 3; Aug. 1, 1991, pp. 395-400, XP000263213, ISSN: 0098-3063.

(Continued)

*Primary Examiner*—Vijay B Chawan
(74) *Attorney, Agent, or Firm*—Townsend and Townsend and Crew LLP

(57) ABSTRACT

A language analyzer 2 performs speech recognition on a speech input by a speech input unit 1, specifies a possible word which is represented by the speech, and the score thereof, and supplies word data representing them to an agent processing unit 6. The agent processing unit 6 stores process item data which defines a data acquisition process to acquire word data or the like, a discrimination process, and an input/output process, and wires or data defining transition from one process to another and giving a weighting factor to the transition, and executes a flow represented generally by the process item data and the wires to thereby control devices belonging to an input/output target device group 5. To which process in the flow the transition takes place is determined by the weighting factor of each wire, which is determined by the connection relationship between a point where the process has proceeded and the wire, and the score of word data. The wire and the process item data can be downloaded from an external server.

13 Claims, 19 Drawing Sheets

U.S. PATENT DOCUMENTS

| | | |
|---|---|---|
| 6,584,439 B1 * | 6/2003 | Geilhufe et al. ............. 704/270 |
| 2002/0069063 A1 * | 6/2002 | Buchner et al. ............. 704/270 |
| 2002/0156830 A1 | 10/2002 | Gayama |

FOREIGN PATENT DOCUMENTS

| | | |
|---|---|---|
| JP | 04-324312 | 11/1992 |
| JP | 2000-181500 | 6/2000 |
| JP | 2002-165298 | 6/2002 |
| JP | 2002-182688 | 6/2002 |
| JP | 2003-140664 | 5/2003 |

OTHER PUBLICATIONS

European Search Report of Application No. 04801318.9-2225, dated Jul. 24, 2007.

* cited by examiner

| TITLE OF MUSIC PIECE | ARTIST | MD/CD IDENTIFYING INFORMATION | TRUCK No | TEMPO | ATTRIBUTION INFORMATION |
|---|---|---|---|---|---|

FIG.3A

| PITCH A | PRODUCTION HISTORY DATA(REPRODUCTION DATA, STOP DATA, NUISANCE DATA) |
|---|---|
| PITCH B | HISTORY DATA |

FIG.3B

| TRIGGER ACQUISITION PROCESS SYMBOL : TG | TRANSITION CONSTANT k |
|---|---|
| TG01 : CONCEPT "REPRODUCTION" | 0.8 |
| TG02 : WORDS "LISTEN TO MD" | 0.7 |
| TG03 : WORD "STOP" | 0.5 |
| TG04 : WORD "NOISY" | 0.5 |
| ⋮ | ⋮ |

| DETERMINATION PROCESS SYMBOL : CNxx | TRANSITION CONSTANT k |
|---|---|
| CN01 : WINDOW OPEN? | Yes: 0.5  No: 0.5 |
| CN02 : WHICH ONE OF MD PLAYER, CD PLAYER, AND HDD IS IN OPERATION? | MD: 0.5  CD: 0.5  HDD: 0.5 |
| ⋮ | ⋮ |

| DETERMINATION PROCESS(INQUIRY MADE) | TRANSITION CONSTANT k |
|---|---|
| SYMBOL : QBxx | |
| QB01 : PLAY MD? PLAY CD? PLAY HDD? | MD: 0.5  CD: 0.5  HDD: 0.5 |
| QB02 : CLOSE WINDOW? | Yes: 0.5  No: 0.3 |
| QB03 : TURN UP VOLUME? | Yes: 0.8  No: 0.5 |
| ⋮ | ⋮ |

| OUTPUT PROCESS SYMBOL : EXxx | TRANSITION CONSTANT k |
|---|---|
| EX01 : CLOSE WINDOW | 0.8 |
| EX02 : PLAY MD | 0.8 |
| EX03 : PLAY CD | 0.8 |
| ⋮ | ⋮ |

FIG.9

| WIRE Wn | PRECEDING NODE | FOLLOWING NODE | WEIGHTING FACTOR J |
|---|---|---|---|
| W1 | = From (TG01.1) | To (CN01.1), | 1.0 |
| W2 | = From (CN01.3) | To (EX01.1), | 0.5 |
| W3 | = From (CN01.2) | To (QB01.1), | 0.5 |
| W4 | = From (TG02.1) | To (EX03.1), | 1.0 |
| W5 | = From (QB01.3) | To (EX03.1), | 0.25 |
| W6 | = From (QB01.2) | To (EX02.1), | 0.25 |
| W7 | = From (EX01.2) | To (QB01.1), | 0.5 |
| W8 | = From (TG03.1) | To (EX02.1), | 1.0 |
| W9 | = From (QB01.4) | To (EX04.1), | 0.25 |
| W10 | = From (TG04.1) | To (CN04.1), | 1.0 |
| W11 | = From (TG05.1) | To (CN02.1), | 1.0 |
| W12 | = From (CN02.3) | To (EX06.1), | 0.5 |
| W13 | = From (CN02.2) | To (EX05.1), | 0.5 |
| W14 | = From (CN02.4) | To (EX07.1), | 0.5 |
| W15 | = From (TG06.1) | To (CN03.1), | 1.0 |
| W16 | = From (CN03.2) | To (EX08.1), | 0.5 |
| W17 | = From (CN03.3) | To (EX09.1), | 0.5 |
| W18 | = From (CN03.4) | To (EX10.1), | 0.5 |
| W19 | = From (TG06.1) | To (EX11.1), | 1.0 |
| W20 | = From (TG07.1) | To (EX11.1), | 1.0 |
| W21 | = From (EX11.2) | To (CN04.1), | 1.0 |
| W22 | = From (CN03.2) | To (EX12.1), | 0.5 |
| W23 | = From (CN03.3) | To (EX13.1), | 0.5 |
| W24 | = From (TG09.1) | To (CN05.1), | 1.0 |
| W25 | = From (CN05.3) | To (QB11.1), | 1.0 |
| W26 | = From (QB11.2) | To (QB12.1), | 0.5 |
| W27 | = From (QB12.2) | To (EX14.1), | 0.25 |
| W28 | = From (QB12.3) | To (EX15.1), | 0.25 |
| W29 | = From (QB12.4) | To (EX16.1), | 0.25 |
| W30 | = From (CN05.2) | To (QB13.1), | 1.0 |
| W31 | = From (QB13.2) | To (EX17.1), | 0.5 |
| W32 | = From (QB11.3) | To (EX14.1), | 0.5 |
| W33 | = From (QB11.4) | To (EX15.1), | 0.5 |
| W34 | = From (QB11.5) | To (EX16.1), | 0.5 |
| W35 | = From (QB13.3) | To (EX14.1), | 0.5 |
| W36 | = From (QB13.4) | To (EX15.1), | 0.5 |
| W37 | = From (QB13.5) | To (EX16.1), | 0.5 |
| ⋮ | | | |

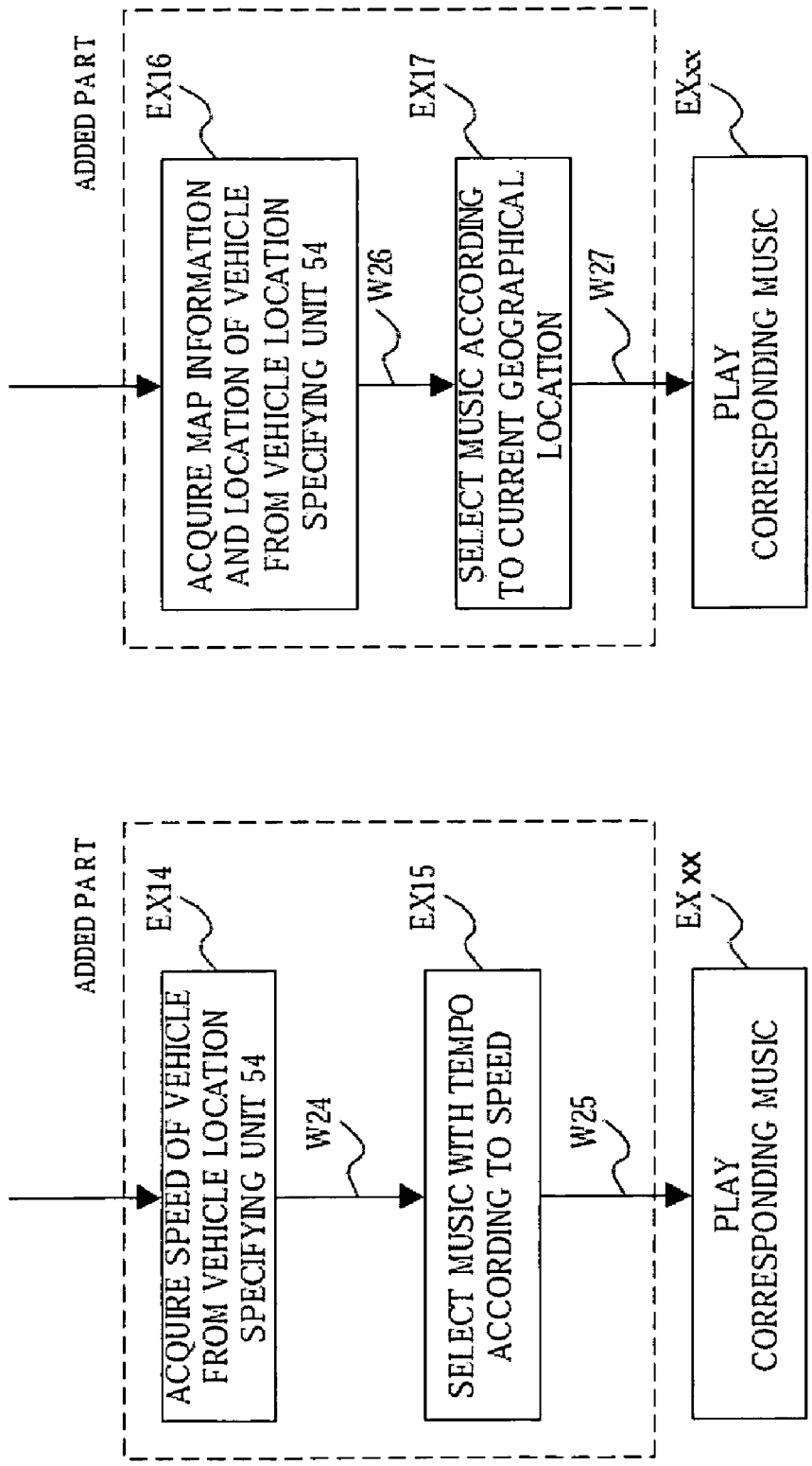

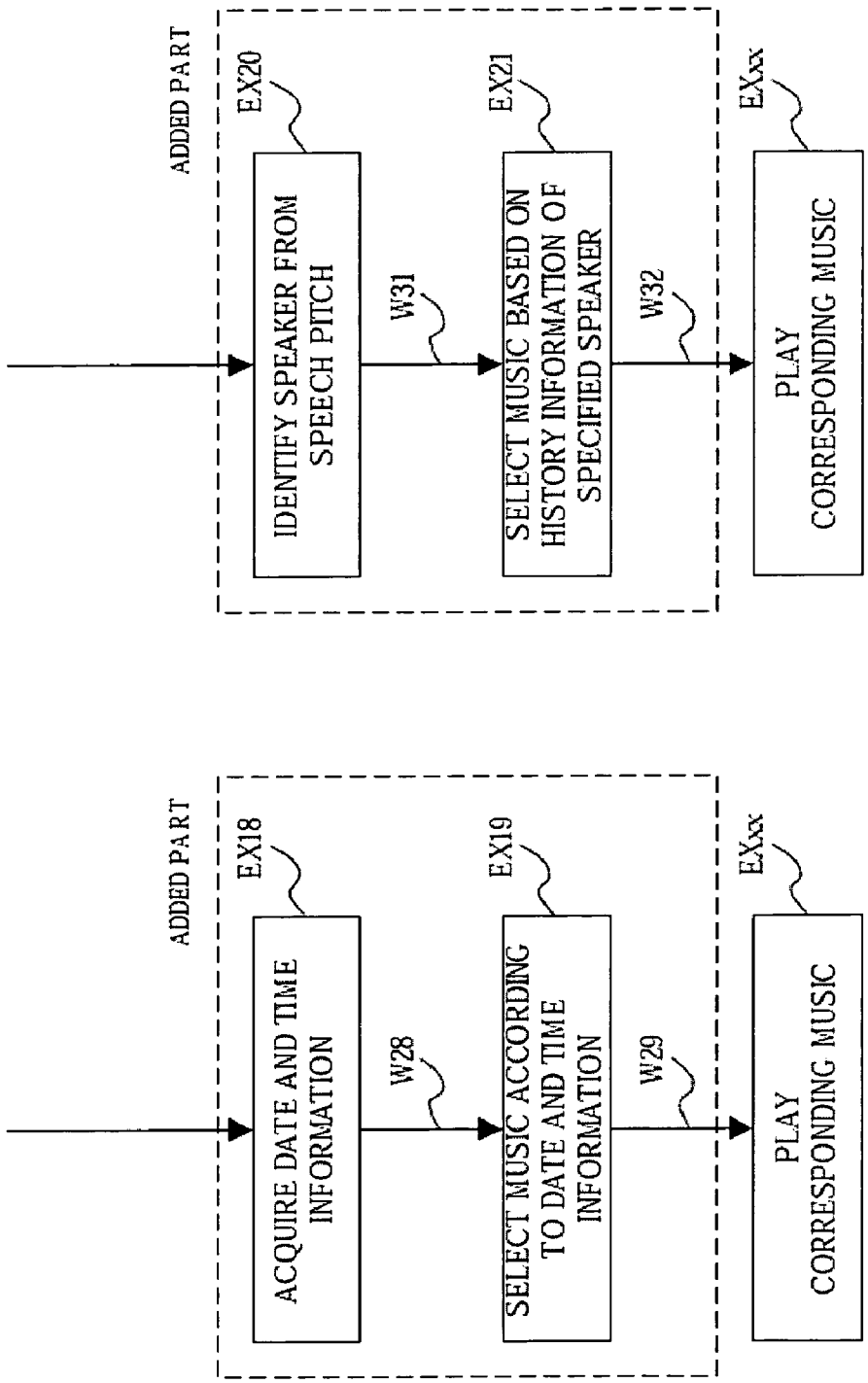

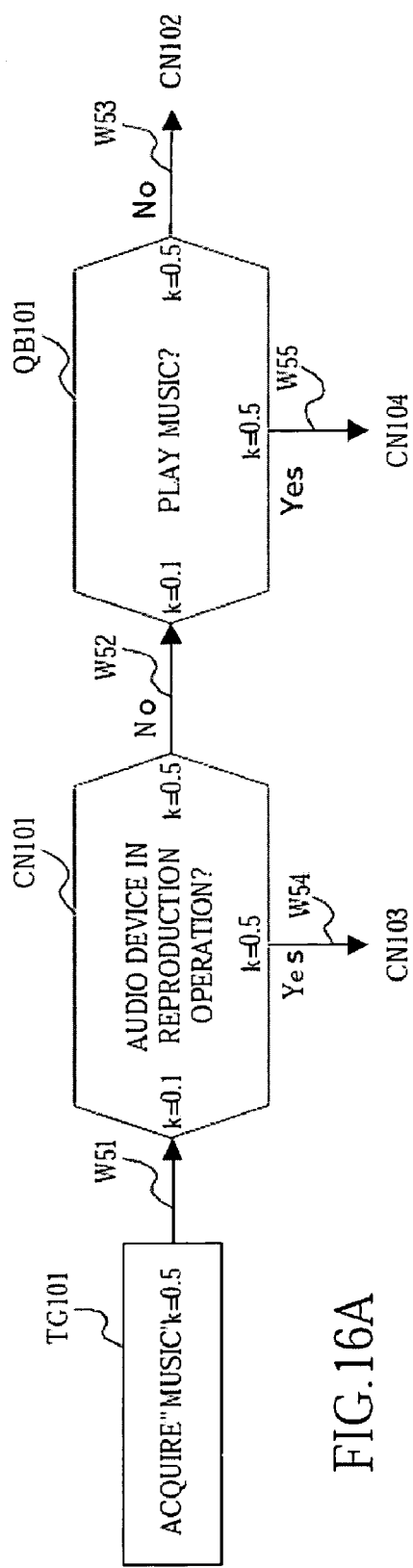
FIG.16A
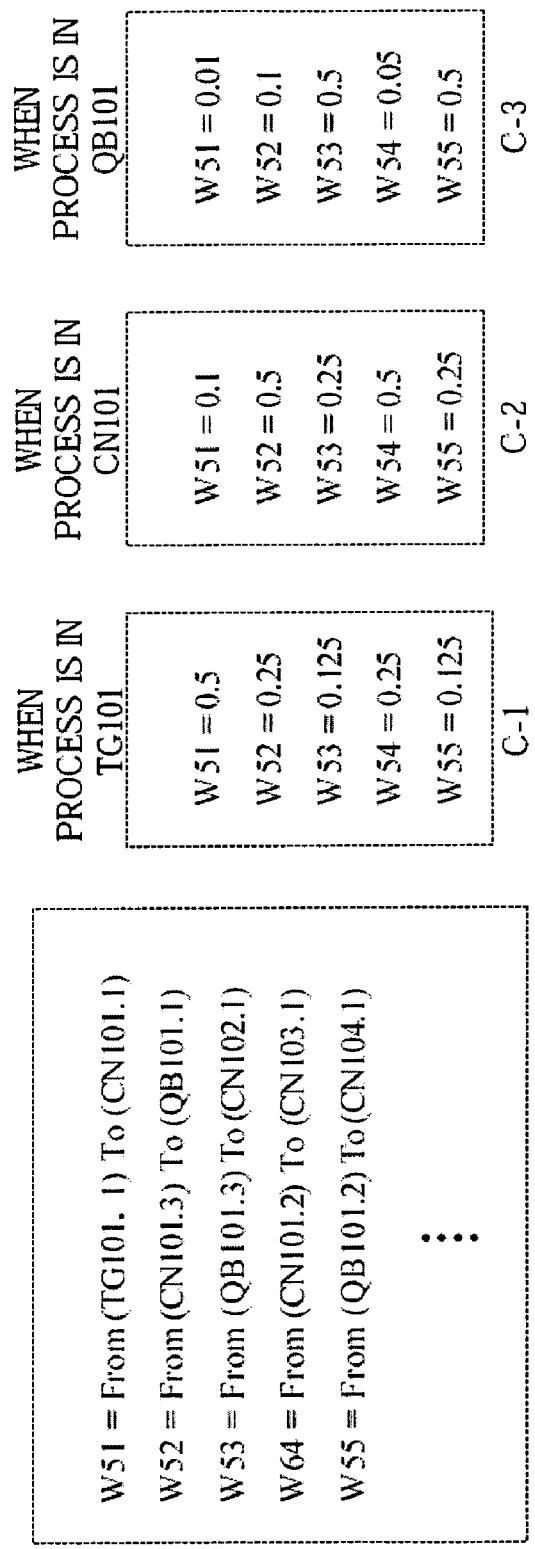
FIG.16B
FIG.16C

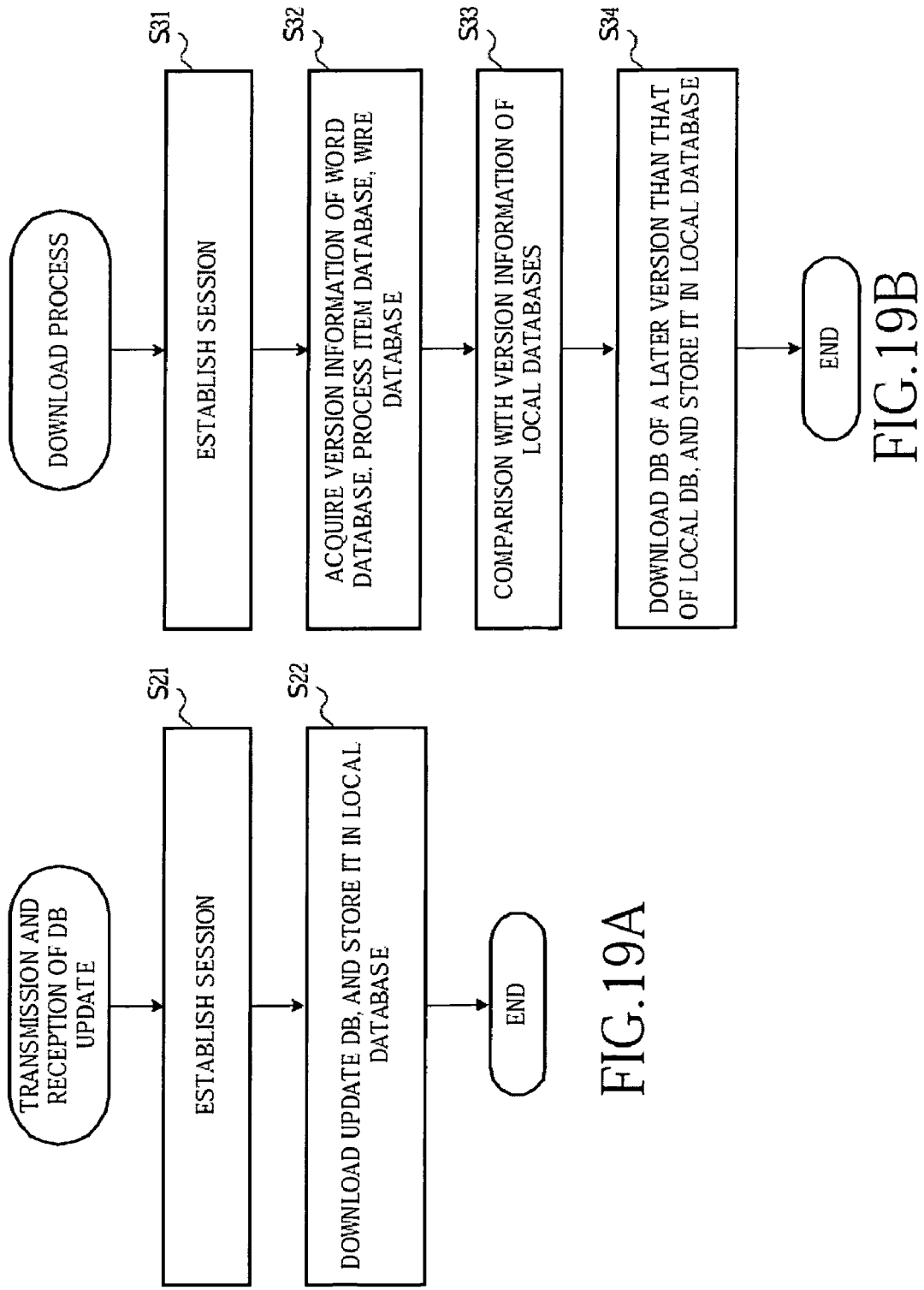

AUDIO DEVICE CONTROL DEVICE, AUDIO DEVICE CONTROL METHOD, AND PROGRAM

CROSS-REFERENCES TO RELATED APPLICATIONS

This present application claims priority to Japanese Application No. 2003-406669, filed on Dec. 5, 2003, commonly assigned and hereby which is incorporated by reference in its entirety.

TECHNICAL FIELD

The present invention relates to an audio device control device, an audio device control method, and a program.

BACKGROUND OF THE INVENTION

Recently, a scheme of recognizing speeches using a speech recognition technology, and controlling electric devices or the like in response to the recognition result are used. Specifically, the scheme identifies a word represented by an input speech, discriminates whether the identified word matches a predetermined keyword or not, and controls an external device based on the discrimination result. Such a scheme is used for controlling, for example, an audio device (see, for example, Patent Literature 1 and Patent Literature 2).

Patent Literature 1: Unexamined Japanese Patent Application KOKAI Publication No. H4-324312

Patent Literature 2: Unexamined Japanese Patent Application KOKAI Publication No. 2002-182688

BRIEF SUMMARY OF THE INVENTION

Problem to be Solved by the Invention

It is, however, difficult to completely recognize an instruction aurally uttered in the form of a language by a human being. Accordingly, there is a case where the scheme cannot adequately respond to an instruction uttered in the form of a language by a human being.

The present invention has been made in view of the above situation, and it is an object of the invention to provide an audio device control device, an audio device control method, and a program which can control a device adequately in response to an instruction uttered in the form of a language by a human being.

Means for Solving the Problem

To achieve the object, an audio device control device according to the first aspect of the invention comprises:

speech recognition means which acquires speech data representing a speech, and specifies a candidate for a phrase represented by the speech by performing speech recognition on the speech data;

operational status information acquisition means which acquires operational status information indicating an operational status of an audio device to be controlled; and audio device control means which specifies a use mode of the audio device desired by an utterer of the speech, based on the candidate specified by the speech recognition means, and an operation to be applied to the audio device to realize the use mode, based on the operational status information acquired by the operational status information acquisition An audio device control device according to the second aspect of the invention comprises:

speech recognition means which acquires speech data representing a speech, and specifies a candidate for a phrase represented by the speech by performing speech recognition on the speech data; and audio device control means which specifies a use mode of an external audio device desired by an utterer of the speech, and an operation to be applied to the audio device to realize the use mode, based on the candidate specified by the speech recognition means, and environmental data indicating a circumstance of an environment under which the audio device is used, and/or operational status data indicating an operational status of the audio device, and controls the audio device to apply the specified operation.

An audio device control device according to the third aspect of the invention comprises:

speech recognition means which acquires speech data representing a speech, and specifies a candidate for a phrase represented by the speech by performing speech recognition on the speech data;

utterer specification means which specifies an utterer of the speech or an attribute of the utterer based on the speech data;

audio device control means which specifies a use mode of an external audio device desired by the utterer of the speech, and an operation to be applied to the audio device to realize the use mode, based on the candidate specified by the speech recognition means, the utterer or the attribute thereof specified by the utterer specification means, and environmental data indicating a circumstance of an environment under which the audio device is used, and/or operational status data indicating an operational status of the audio device, and controls the audio device to apply the specified operation.

The environmental data comprises, for example, data indicating a current location of the environment under which the audio device is used.

The environmental data comprises, for example, data indicating a sound insulation circumstance of the environment under which the audio device is used.

An audio device control method according to the fourth aspect of the invention comprises:

a speech recognition step of acquiring speech data representing a speech, and specifying a candidate for a phrase represented by the speech by performing speech recognition on the speech data;

an operational status acquisition step of acquiring an operational status of an audio device to be controlled; and an audio device control step of specifying a use mode of the audio device desired by an utterer of the speech, based on the candidate specified by the speech recognition step, and an operation to be applied to the audio device to realize the use mode, based on the operational status acquired by the operational status acquisition step, and controlling the audio device to apply the specified operation.

An audio device control method according to the fifth aspect of the invention comprises:

a speech recognition step of acquiring speech data representing a speech, and specifying a candidate for a phrase represented by the speech by performing speech recognition on the speech data; and an audio device control step of specifying a use mode of an external audio device desired by an utterer of the speech, and an operation to be applied to the audio device to realize the use mode, based on the candidate specified by the speech recognition step, and environmental data indicating a circumstance of an environment under which the audio device is used, and/or operational status data indicating an operational status of the audio device, and controlling the audio device to apply the specified operation.

An audio device control method according to the sixth aspect of the invention comprises:

a speech recognition step of acquiring speech data representing a speech, and specifying a candidate for a phrase represented by the speech by performing speech recognition on the speech data;

an utterer specification step of specifying an utterer of the speech or an attribute of an utterer based on the speech data;

an audio device control step of specifying a use mode of an external audio device desired by the utterer of the speech, and an operation to be applied to the audio device to realize the use mode, based on the candidate specified by the speech recognition means, the utterer or the attribute thereof specified by the utterer specification means, and environmental data indicating a circumstance of an environment under which the audio device is used, and/or operational status data indicating an operational status of the audio device, and controlling the audio device to apply the specified operation.

A computer program according to the seventh aspect of the invention allows a computer to execute:

a speech recognition step of acquiring speech data representing a speech, and specifying a candidate for a phrase represented by the speech by performing speech recognition on the speech data;

an operational status acquisition step of acquiring an operational status of an audio device to be controlled; and an audio device control step of specifying a use mode of the audio device desired by an utterer of the speech, based on the candidate specified by the speech recognition step, and an operation to be applied to the audio device to realize the use mode, based on the operational status acquired by the operational status acquisition step, and controlling the audio device to apply the specified operation.

A computer program according to the eighth aspect of the invention allows a compute to execute:

a speech recognition step of acquiring speech data representing a speech, and specifying a candidate for a phrase represented by the speech by performing speech recognition on the speech data; and an audio device control step of specifying a use mode of an external audio device desired by an utterer of the speech, and an operation to be applied to the audio device to realize the use mode, based on the candidate specified by the speech recognition step, and environmental data indicating a circumstance of an environment under which the audio device is used, and/or operational status data indicating an operational status of the audio device, and controlling the audio device to apply the specified operation.

A computer program according to the ninth aspect of the invention allows a computer to execute:

a speech recognition step of acquiring speech data representing a speech, and specifying a candidate for a phrase represented by the speech by performing speech recognition on the speech data;

an utterer specification step of specifying an utterer of the speech or an attribute of an utterer based on the speech data;

an audio device control step of specifying a use mode of an external audio device desired by the utterer of the speech, and an operation to be applied to the audio device to realize the use mode, based on the candidate specified by the speech recognition means, the utterer or the attribute thereof specified by the utterer specification means, and environmental data indicating a circumstance of an environment under which the audio device is used, and/or operational status data indicating an operational status of the audio device, and controlling the audio device to apply the specified operation.

EFFECT OF THE INVENTION

The present invention realizes an audio device control device, an audio device control method, and a program which can control a device adequately in response to an instruction uttered in the form of a language by a human being.

BRIEF DESCRIPTION OF THE DRAWINGS

FIG. 3. A diagram showing an example of the data structure of a music database.

FIG. 9. A diagram showing examples of wires.

FIG. 14. A diagram showing a flow represented generally by the process item database and the wire database.

FIG. 15. A diagram showing a flow represented generally by the process item database and the wire database.

FIG. 16. A diagram for explaining a weighting factor J set to each wire.

FIG. 19. A flowchart for explaining a download process.

Figure 1:
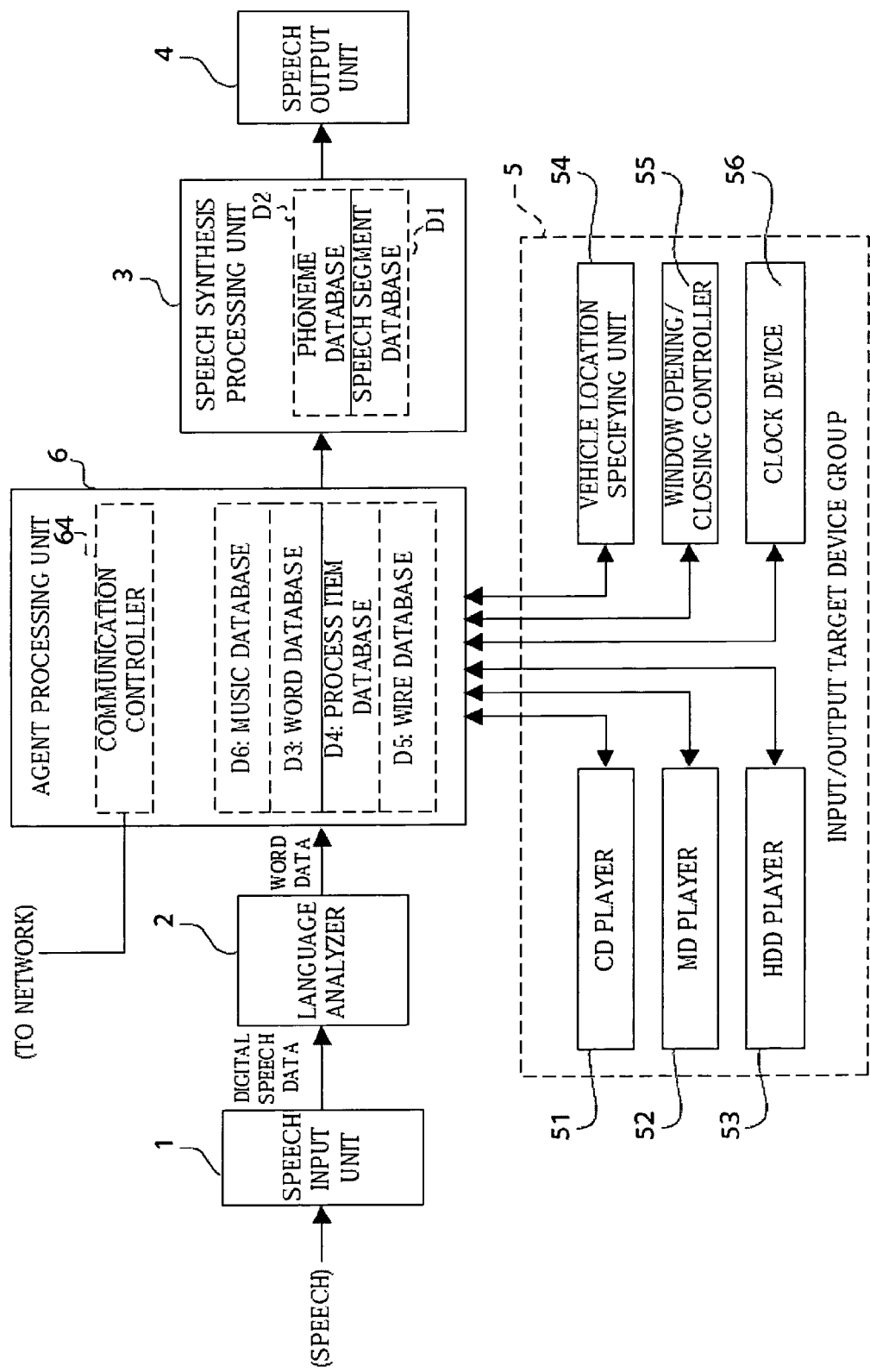
FIG. 1. A diagram showing an audio device control system according to an embodiment of the present invention.

EXPLANATION OF REFERENCE NUMERALS 1 speech input unit
2 language analyzer
3 speech synthesis processing unit
4 speech output unit
5 input/output target device group
51 CD player
52 MD player
53 HDD player
54 vehicle location specifying unit
55 window opening/closing controller
56 clock
6 agent processing unit

DETAILED DESCRIPTION OF THE INVENTION

Best Mode for Carrying Out the Invention

An embodiment of the present invention will be explained below, taking an audio device control system provided in a vehicle as an example, by referring to the drawings.

Figure 2:
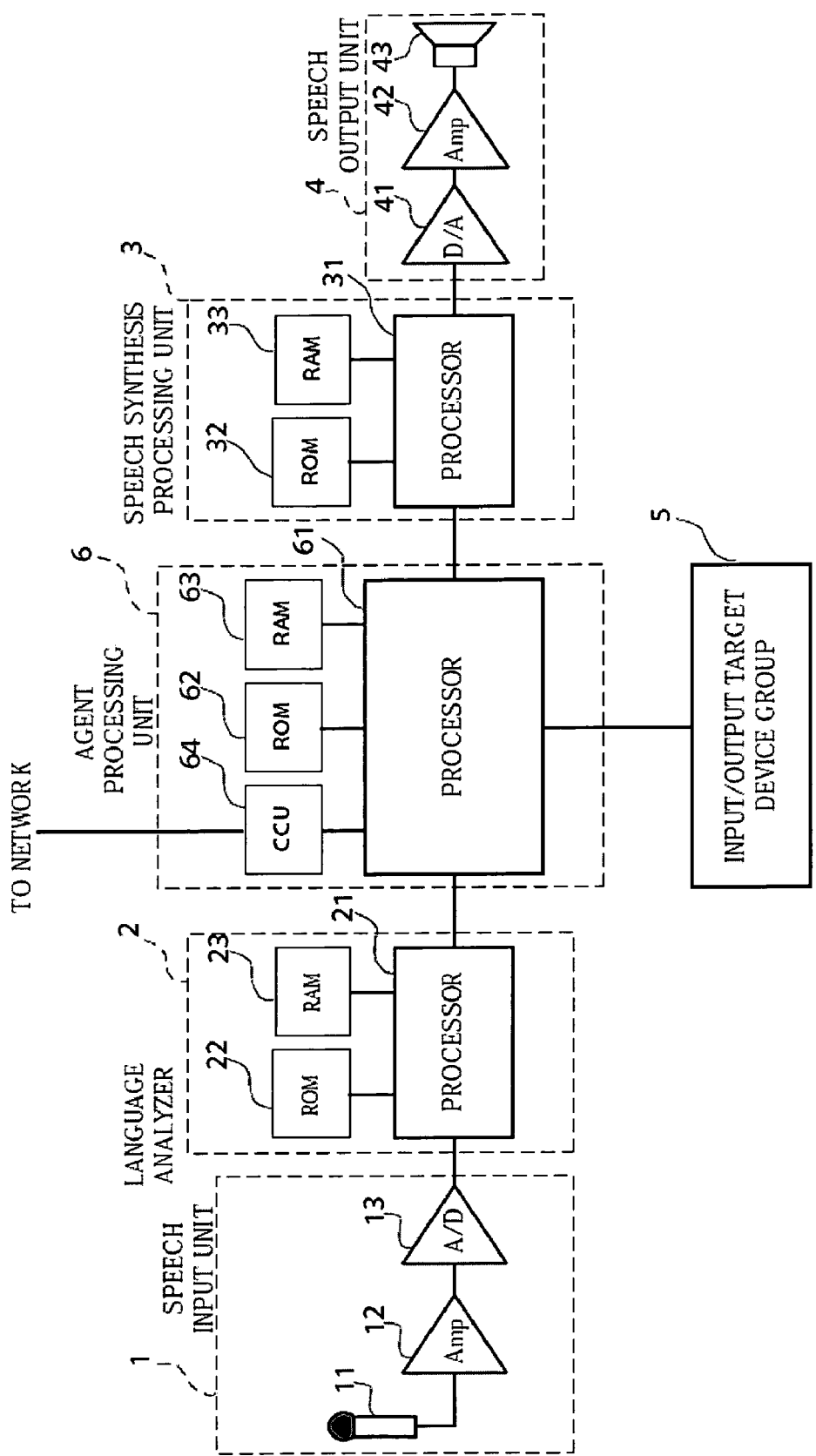
FIG. 2. A more detailed structural diagram of the audio device control system according to the embodiment.

FIG. 1 is a block diagram showing the structure of the audio device control system. FIG. 2 is a block diagram showing an example of the physical structures of individual sections.

As shown in FIG. 1, the audio control system comprises a speech input unit 1, a language analyzer 2, a speech synthesis processing unit 3, a speech output unit 4, an input/output target device group 5, and an agent processing unit 6.

The speech input unit 1 receives a speech, generates speech data of a digital form from the input speech, and supplies the speech data to the language analyzer 2. Specifically, the speech input unit 1 comprises, for example, a microphone 11, an AF (Audio Frequency) amplifier 12, and an A/D (Analog-to-Digital) converter 13 incorporating a sample and hold circuit as shown in FIG. 2. The microphone 11 converts a speech to a speech signal, and outputs the signal. The AF amplifier 12 amplifies the speech signal from the microphone 11, and outputs the signal. The A/D converter 13 performs sampling and A/D conversion of the amplified speech signal from the AF amplifier 12, generates digital speech data, and supplies the data to the language analyzer 2.

As shown in FIG. 2, each of the language analyzer 2, the speech synthesis processing unit 3 and the agent processing unit 6 comprises a processor 21, 31, 61 comprising, for example, a CPU (Central Processing Unit), a non-volatile memory 22, 32, 62, such as a hard disk drive, which stores a program to be run by the processor 21, 31, 61, and a volatile memory 23, 33, 63, such as a RAM (Random Access Memory), which has a memory area to be a work area for the processor. A part or all of the functions of the language analyzer 2, the speech synthesis processing unit 3, and the agent processing unit 6 may be achieved by a single processor, or a single non-volatile memory and a single volatile memory.

The language analyzer 2 performs a speech recognition process on speech data supplied from the speech input unit 1. Through the speech recognition process, the language analyzer 2 specifies a candidate for a word represented by the speech data, and the likelihood (score) of the candidate. The scheme for speech recognition is arbitrary. A plurality of candidates may be specified for a word. The language analyzer 2 generates data indicating a specified candidate and the score of the candidate (hereinafter, called word data), and supplies them to the agent processing unit 6.

The non-volatile memory 32 of the speech synthesis processing unit 3 stores a speech segment database D1 which stores data representing waveforms of words, and a phoneme database D2 which stores data representing waveforms for constituting phonemes.

The speech segment database D1 stores data representing waveforms of words. The phoneme database D2 stores data representing waveforms for constituting phonemes. The speech synthesis processing unit 3 generates digital speech data representing a speech reading out text data supplied from the agent processing unit 6 by using the data stored in the speech segment database D1 and/or the phoneme database D2.

The speech synthesis processing unit 3 supplies the generated speech data to the speech output unit 4. The scheme of generating digital speech data is arbitrary; for example, slot filling method and rule-based synthesis (Rule-based synthesis) can be used. The slot filling method is a method by which, for example, word-by-word speeches are read by an announcer, and are linked together and output. The rule-based synthesis is a method by which relatively small units, such as phonemes (consonants or vowels) or kana, are linked together and output.

The speech output unit 4 reproduces a speech represented by digital speech data supplied from the speech synthesis processing unit 3. More specifically, the speech output unit 4 has a D/A (Digital-to-Analog) converter 41, an AF amplifier 42, and a speaker 43 as shown in FIG. 2. The D/A converter 41 performs DA conversion on digital speech data supplied from the speech synthesis processing unit 3, and converts the data to an analog speech signal. The AF amplifier 42 amplifies the analog speech signal. The speaker 43 vibrates in accordance with the analog speech signal to reproduce and output a speech represented by the analog speech data.

The input/output target device group 5 comprises, for example, a CD (Compact Disc) player 51, an MD (Mini Disc) player 52, an HDD (hard disk drive) player 53, a vehicle location specifying unit 54, a window opening/closing controller 55, and a clock device 56.

The CD player 51 performs operations, such as reproduction of a speech represented by speech data recorded in a CD loaded in the player, stop of reproduction, mute, fast forward reproduction, rewind reproduction, pause, and ejection of the CD, in accordance with a control signal supplied from the agent processing unit 6.

The MD player 52 performs operations, such as reproduction of a speech represented by speech data recorded in an MD loaded in the player, stop of reproduction, mute, fast forward reproduction, rewind reproduction, pause, and ejection of a CD, in accordance with a control signal supplied from the agent processing unit 6.

The HDD player 53 is a non-volatile magnetic disk, performs operations, such as storing of speech data, reproduction of a speech represented by the speech data, stop of the reproduction, mute, fast forward reproduction, rewind reproduction, and pause, in accordance with a control signal supplied from the agent processing unit 6.

The vehicle location specifying unit 54 comprises a well-known car navigation system or the like which uses a GPS (Global Positioning System) mobile station. The vehicle location specifying unit 54 detects the current location of a vehicle in accordance with a control signal supplied from, for example, the agent processing unit 6, generates data representing with which location on a map the detected current location matches, and supplies the data to the agent processing unit 6.

The window opening/closing controller 55 comprises a motor, a control circuit which controls rotation and stopping of the motor according to a control signal, a winch which moves a window glass in accordance with the rotation of the motor, and the like. The window opening/closing controller 55 performs opening/closing the window of the vehicle in accordance with a control signal supplied to that controller. The control circuit of the window opening/closing controller 55 generates data representing, e.g., data indicating the open amount of the window subject to opening/closing, and outputs the data.

The clock device 56 comprises, for example, a crystal oscillator, a counter circuit, and the like. The clock device 56 sequentially generates data indicating a current time, and supplies it to the agent processing unit 6. The clock device 56 may use time information obtained from the GPS through the car navigation system.

The agent processing unit 6 has a communication controller 64 comprising a modem, a packet communication terminal, or the like, and connects to a distribution server 100 to be discussed later over an external network (e.g., the Internet via a wireless telephone circuit) via the communication controller.

The non-volatile memory 62 of the agent processing unit 6 further stores a music database D6. The music database D6 stores the title of a music piece, the artist name of an artist who plays the music piece, a CD, an MD, and/or the HDD 53 recording the music piece, and the number of a track on the CD, the MD, and/or HDD 53 where the music piece is recorded in association with one another.

Specifically, as shown in FIG. 3A, the music database D6 stores the title of a music piece, the artist name of an artist who plays the music piece, IDs (identification information) of a CD, an MD, and/or the HDD 53 recording the music piece, the number of the track on the CD, the MD, and/or the HDD 53 where the music piece is recorded, the tempo of the music piece, and various kinds of attribution information about the music piece (e.g., information, such as a season, a time zone, and a geographical location for which the atmosphere of the music piece is suitable) in association with one another.

The music database D6 stores user information specifying the user and reproduction history information indicating the reproduction history of the music piece in association with each other. The user information, which should not necessarily be information capable of specifying the user, is information that can distinguish the user. The user information comprises, for example, basic pitch information indicating the shape of a basic pitch of a speech waveform of each user, and is acquired by the speech input section 1, and supplied from the language analyzer 2 accompanying word data. The reproduction history information includes information specifying the music piece, information indicating that the music piece has been reproduced, information indicating that the reproduction of the music piece has been repeated, information indicating that the reproduction has been stopped in the middle thereof, history information for utterance of a negative impression like "noisy" in the middle of the music piece, and the like. Analyzing those information enables discrimination of the user's preference (favorite music, dislike music).

The non-volatile memory 62 of the agent processing unit 6 stores a word database D3. The word database D3 stores data of plurality of words and one or more flags for word grouping indicating a plurality of word groupings in association with one another.

Individual flags associated with a single word are grouped in association with certain concepts. When a flag indicates a predetermined value (hereinafter, let the value be "1"), a word associated with the flag is grouped into a group associated with the flag. On the other hand, when the flag indicates another value (for example, "0"), the word does not belong to the group associated with the flag.

Figure 4:
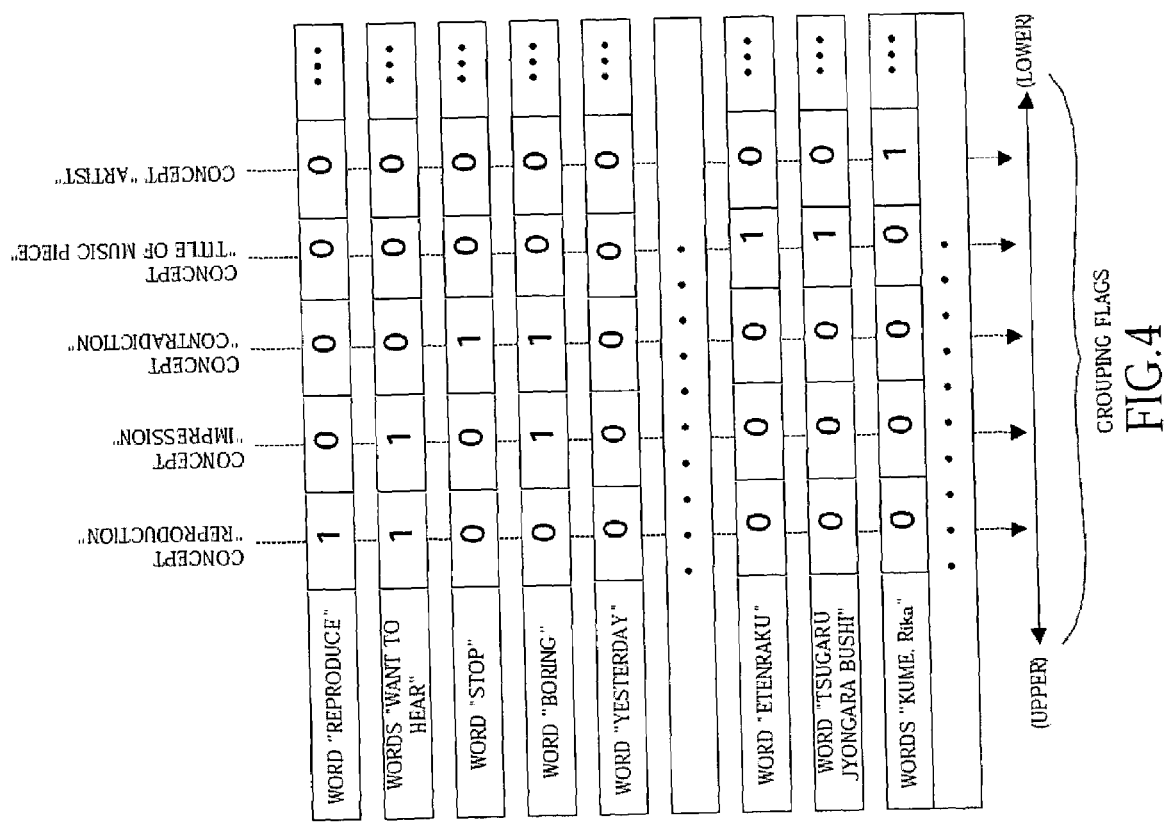
FIG. 4. A diagram exemplarily showing a specific example of a word database.

FIG. 4 is a diagram exemplarily showing a specific example of grouping flags. As shown in FIG. 4, predetermined numbers of word grouping flags (bits) are associated with a plurality of words ("reproduce", "want to hear", "stop", "boring", "yesterday", "Etenraku", "Tsugaru jyongara bushi", "KUME, Rika"). Regarding a flag group associated with any of the words, the most significant flag is associated with a concept "reproduction", the second bit flag from the top is associated with a concept "impression", the third bit flag from the top is associated with a concept "denial", the fourth bit flag from the top is associated with a concept "title of music piece", and the fifth bit flag from the top is associated with a concept "artist".

On the other hand, as shown in the figure, the value of a flag group of upper 5 bits associated with the word "reproduce" is a binary number "10000", the value of a flag group of upper 5 bits associated with the word "want to hear" is a binary number "11000", the value of a flag group associated with a word "stop" is a binary number "001000", the value of a flag group associated with a word "boring" is a binary number "01100", the value of a flag group associated with a word "yesterday" is a binary number "00000", the value of flag groups associated with words "Etenraku" and "Tsugaru jyongara bushi" are binary numbers "00010", and the value of a flag group associated with a word "KUME, Rika" is a binary number "00001".

In this case, the flag group indicates that words "reproduce" and "want to hear" are grouped under the concept "reproduction", the words "want to hear" and "boring" are grouped under the concept "impression", the words "stop" and "boring" are grouped under the concept "denial", the words "Etenraku" and "Tsugaru jyongara bushi" are grouped under the concept "title of music piece", and the word "KUME, Rika" is grouped under the concept "artist".

There may be a word which is not grouped under any concept, like the word "yesterday".

The individual words and the individual concepts are used as, for example, "triggers", "discrimination conditions", and the like of the individual process items stored in a process item database D4.

The non-volatile memory 62 of the agent processing unit 6 further stores the process item database D4 and a wire database D5.

The process item database D4 is a database storing data (process item data) which describes the contents of various processes to be executed by the agent processing unit 6, e.g., a trigger acquisition process (TGxx), a discrimination process (CNxx or QBxx), and an input/output process (EXxx to be discussed later), process item (pointer) by process item. Note that "xx" is an identification number.

Of the process items stored in the process item database D4, data describing the contents of the "trigger acquisition process (TGxx)" includes trigger data (data designating the contents of data to be acquired as a trigger) which specifies a trigger to start those processes and a transition constant k for determining the progress direction to be discussed later (a constant which indicates the degree of transition in the progress direction and becomes a calculation standard for a weighting factor J to be described later).

Trigger data is arbitrary, and is, for example, data indicating the open amount of a window, data indicating the temperature in a room, or the aforementioned word data supplied from the language analyzer 2. Trigger data may be data which is given from the process the agent processing unit 6 itself executes. When trigger data is word data, it may be data indicating the "concept" that is assigned to the group to which a word represented by the word data belongs. It is to be noted that the contents of the trigger acquisition process are described in such a way that a plurality of trigger acquisition processes do not acquire word data representing the same word.

Figures 5A, 5B:
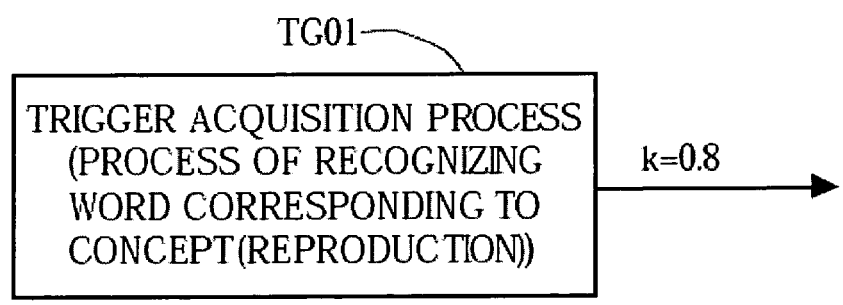
FIG. 5. A diagram for explaining a trigger acquisition process.

FIG. 5A shows an example of a trigger acquisition process TGxx. In this example, a trigger TG01 is a process of acquiring the concept "reproduction" as a trigger (identifying the word grouped under the concept "reproduction" (in the example in FIG. 3, the word "reproduce" or "want to hear")), and the transition constant k for determining whether or not to proceed (transition) to a process following that process is 0.8. FIG. 5B illustrates a flowchart for a trigger acquisition process TG01.

A trigger acquisition process TG02 is a process of acquiring the word "MD". A trigger acquisition process TG03 is a process of acquiring a word belonging to a group associated with the concept "denial" (acquiring either "stop" or "boring" in FIG. 3).

Data describing the contents of a "discrimination process (Cnxx)" stored in the process item database D4 includes a discrimination condition, a list of possible results as discrimination results, a transition constant k for determining the progress direction in a case where the individual discrimination results are taken, and a transition constant k in a return direction to be discussed later for each discrimination process.

Figures 6A, 6B:
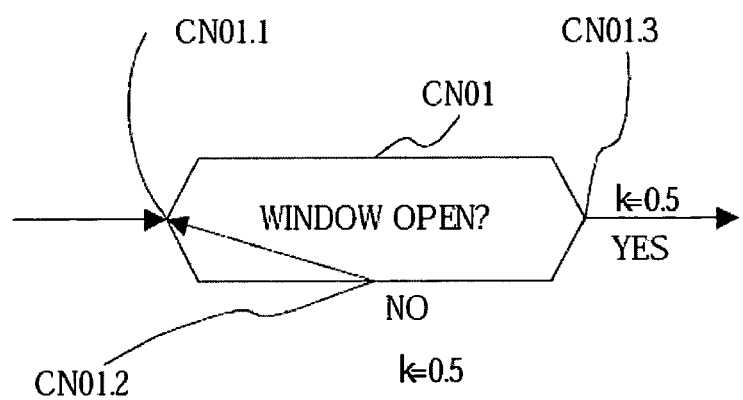
FIG. 6. A diagram for explaining a discrimination process.

FIG. 6A shows an example of a discrimination process CNxx. In this example, a discrimination process CN01 is a "process of discriminating whether a window is open or not", and the transition constant k for determining whether or not to proceed to a subsequent process when it is discriminated as open is 0.5, while the transition constant k for determining whether or not to proceed to a subsequent process when it is not discriminated as open is 0.5. FIG. 6B illustrates a flowchart for this example. A node CN01.1 shown in FIG. 6B is a start node indicating the start point of the process, a node CN01.2 is a node in the progress direction when it is discriminated that a window is closed, and the transition constant k thereof is 0.5. Further, a node CN01.3 is a node in the progress direction when it is discriminated that a window is open, and the transition constant k thereof is 0.5. A discrimination process CN02 is a process of discriminating whether any of the MD player 52, the CD player 51, and the HDD 53 is in operation or not, and the transition constants k for determining whether or not to proceed to a following process when it is discriminated as being in operation are all 0.5.

The "discrimination process" may include a process of acquiring data to be used in discrimination from an arbitrary acquisition source. Possible acquisition sources include, for example, other processes to be executed by the language analyzer 2 and the agent processing unit 6, devices belonging to the input/output target device group 5, and other external devices and sensors, and the like. In this case, data which describes the contents of the discrimination process includes, for example, data specifying an acquisition source for data to be used in discrimination.

The "discrimination process" may include a process of outputting predetermined data to a predetermined output destination prior to discrimination, and acquiring a response to the output (in which case, let a symbol indicating the process be QBxx). As such a kind of the discrimination process is a process of, for example, giving data representing a predetermined inquiry to the speech synthesis processing unit 3 prior to discrimination, and then waiting for an input from the language analyzer 2. In a case where predetermined data is output in the discrimination process QBxx prior to discrimination, data which describes the contents of the process includes, for example, the contents of data to be output and data designating the output destination of the data.

Figures 7A, 7B:
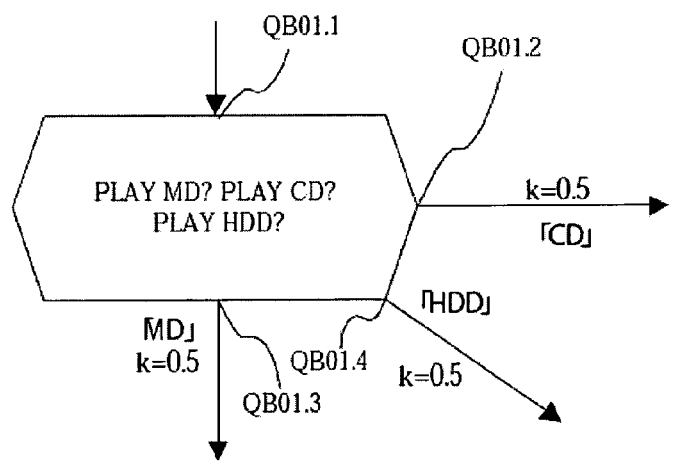
FIG. 7. A diagram for explaining a discrimination process with an inquiry.

FIG. 7A shows an example of a discrimination process QBxx. In this example, a discrimination process QB01, for example, asks a user "Play an MD? Play a CD? Play an HDD?", and the transition constant k when the response (the user's answer) is "MD" is 0.5, the transition constant k when the response is "CD" is 0.5, and the transition constant k when the response is "HDD" is 0.5. FIG. 7B illustrates a flowchart for this example. A node QB01.1 shown in FIG. 7B is a start node indicating the start point of the process, a node QB01.2 is a node in the progress direction when it is discriminated that playing the "CD" is designated in response to the inquiry, and the transition constant k is 0.7. A node QB01.3 is a node in the progress direction when it is discriminated that playing the "MD" is designated, and the transition constant k is 0.5. Further, a node QB01.4 is a node in the progress direction when it is discriminated that playing the "HDD" is designated, and the transition constant k is 0.5.

Data describing the contents of an "input/output process" stored in the process item database D4 comprises data which designates the contents of data to be input or output. Input data and output data may have arbitrary contents. For example, output data may be data representing reading of a speech which is generated by the speech output unit 4 via the speech synthesis processing unit 3 or a control signal which controls an external device. Input data may be, for example, data to be supplied from an external device.

Figures 8A, 8B:
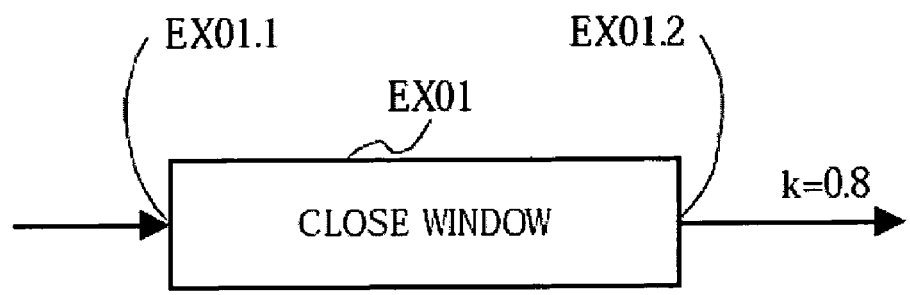
FIG. 8. A diagram for explaining an input/output process.

FIG. 8A shows an example of an input/output process EXxx. In this example, an input/output process EX01, for example, is an operation to "Close a window", and the transition constant k in the progress direction of executing a process after activation is 0.8. FIG. 8B illustrates a flowchart for this example. A node EX01.1 shown in FIG. 8B is a start node indicating the start point of the process, a node EX01.2 is a node indicating the end of the process, and the transition constant k is 0.8. With regard to the input/output process EXxx, selection of a node indicating the end of the process may be an essential process without setting the transition constant k.

The wire database D5 comprises a set of data describing transitions among a plurality of processes (TG, CNxx, QBxx, EXxx) (the data will be hereinafter called wires). A wire comprises data described in, for example, a format illustrated in FIG. 9. As illustrated in the figure, a wire Wn (W1, W2 . . . ) is data which designates a preceding process (X), a following process (Y), and a weighting factor J given to transition, for the transition (From (X) To (Y)) from the preceding process X (From (X)) to the following process Y (To(Y)). When the preceding process X is a discrimination process, it is necessary to describe transition from what discrimination result of the discrimination process.

A transition causing process X and a transition target Y are specified by the node number of each process.

The weighting factor J of each wire is not a fixed value, but is appropriately calculated and set according to the progress of a process. Calculation of the weighting factor J of the wire will be discussed later with reference to FIG. 15.

The agent processing unit 6 executes a flow generally represented by the process item database D4 and the wire database D5. The process item database D4 and the wire database D5 can describe a process flow illustrated in FIGS. 10 to 13 as a whole based on examples of FIGS. 4 to 9.

Figure 10:
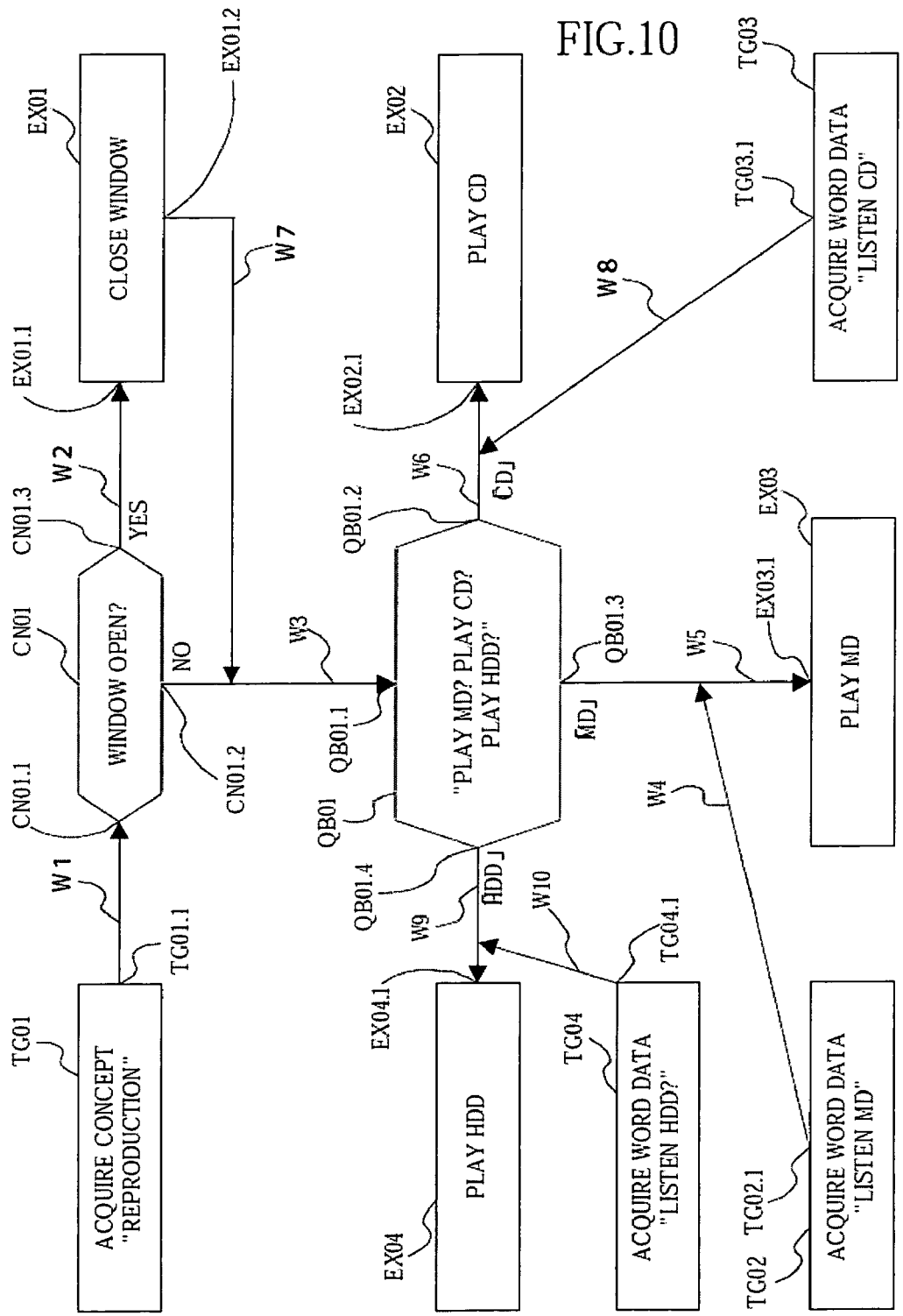
FIG. 10. A diagram showing a flow represented generally by a process item database and a wire database.

In the flow illustrated in FIG. 10, the agent processing unit 6 stands by for word data representing a word belonging to the concept "reproduction" to be supplied from the language analyzer 2 in a trigger process TG01, and acquires the data when supplied, and passes it to a discrimination process CN01 (wire W1).

In the discrimination process CN01, the agent processing unit 6 acquires information representing whether or not a window is open from a window opening/closing controller 54, and the flow proceeds to an input/output process EX01 when having discriminated that it is open (wire W2). In the input/output process EX01, a control signal to instruct closing of the window is output to the window opening/closing controller 54. As a result, the window opening/closing controller 54 closes the window. Subsequently, the flow proceeds to a discrimination process QB01. Prior to execution of the input/output process EX01, a discrimination process QBxx of asking whether a window should be closed or not may be executed, and the input/output process EX01 may be executed according to a response to the discrimination process.

That is, in the example, when having recognized that reproduction of a music piece is instructed, the agent processing unit 6 discriminates whether the window of a vehicle is open or not prior to proceeding to a process of instructing reproduction of the music piece. When having discriminated that it is open, the agent processing unit recognizes that a sound insulation situation in the vehicle is poor and instructs the window opening/closing controller 55 to close the window, or make the speech output section 4 generate a speech, which reads out a message for suggesting closing of the window, through the speech synthesis processing unit 3 before instructing reproduction of the music piece. When word data representing the meaning of "volume up" indicates a high score during reproduction of the music piece, the open/closed status of the window may be detected before a volume-up process, and the speech synthesis processing unit 3 may produce speech data "The window is open. Close the window?" when the window is open, and the speech output section 4 may output the speech data.

When it is discriminated in the discrimination process CN01 that the window is closed, or when the input/output process EX01 is terminated, the flow proceeds to a discrimination process QB01 including an inquiry (wire W3, wire W7). In the discrimination process QB01, first, the agent processing unit 6 supplies the speech synthesis processing unit 3 with data representing a text "Play an MD? Play a CD? Play an HDD?". The speech synthesis processing unit 3 reproduces a speech which reads out the text through the speech output unit 4.

Next, the agent processing unit 6 stands by for data representing a word "MD", a word "CD", or a word "HDD" to be supplied from the language analyzer 2. When corresponding data is supplied, the agent processing unit 6 discriminates which one of the word "MD", "CD", or "HDD" is represented by the data. When it is discriminated that the data represents the word "MD", the flow proceeds to an input/output process EX03 (wire W5), when it is discriminated that the data represents the word "CD", the flow proceeds to an input/output process EX02 (wire W6), and when it is discriminated that the data represents the word "HDD", the flow proceeds to an input/output process EX03 (wire W9).

The agent processing unit 6 outputs a control signal instructing start of playing the CD to the CD device 51 in the input/output process EX02. The agent processing unit 6 outputs a control signal instructing start of playing the MD to the MD device 52 in the input/output process EX03. The agent processing unit 6 outputs a control signal instructing start of playing the HDD to the HDD device 53 in the input/output process EX04.

The agent processing unit 6 stands by for data representing words "listen to an MD" or "play an MD" to be supplied from the language analyzer 2 (trigger process TG02), and shifts control to the input/output process EX03 when it is supplied (wire W4).

Likewise, the agent processing unit 6 stands by for data representing words "listen to a CD" or "play a CD" to be supplied from the language analyzer 2 (trigger process TG03), and shifts the control to the input/output process EX02 when the data is supplied (wire W8).

The agent processing unit 6 stands by for data representing words "listen to an HDD" or "play an HDD" to be supplied from the language analyzer 2 (trigger process TG04), and shifts the control to the input/output process EX04 (wire W8).

Figure 11:
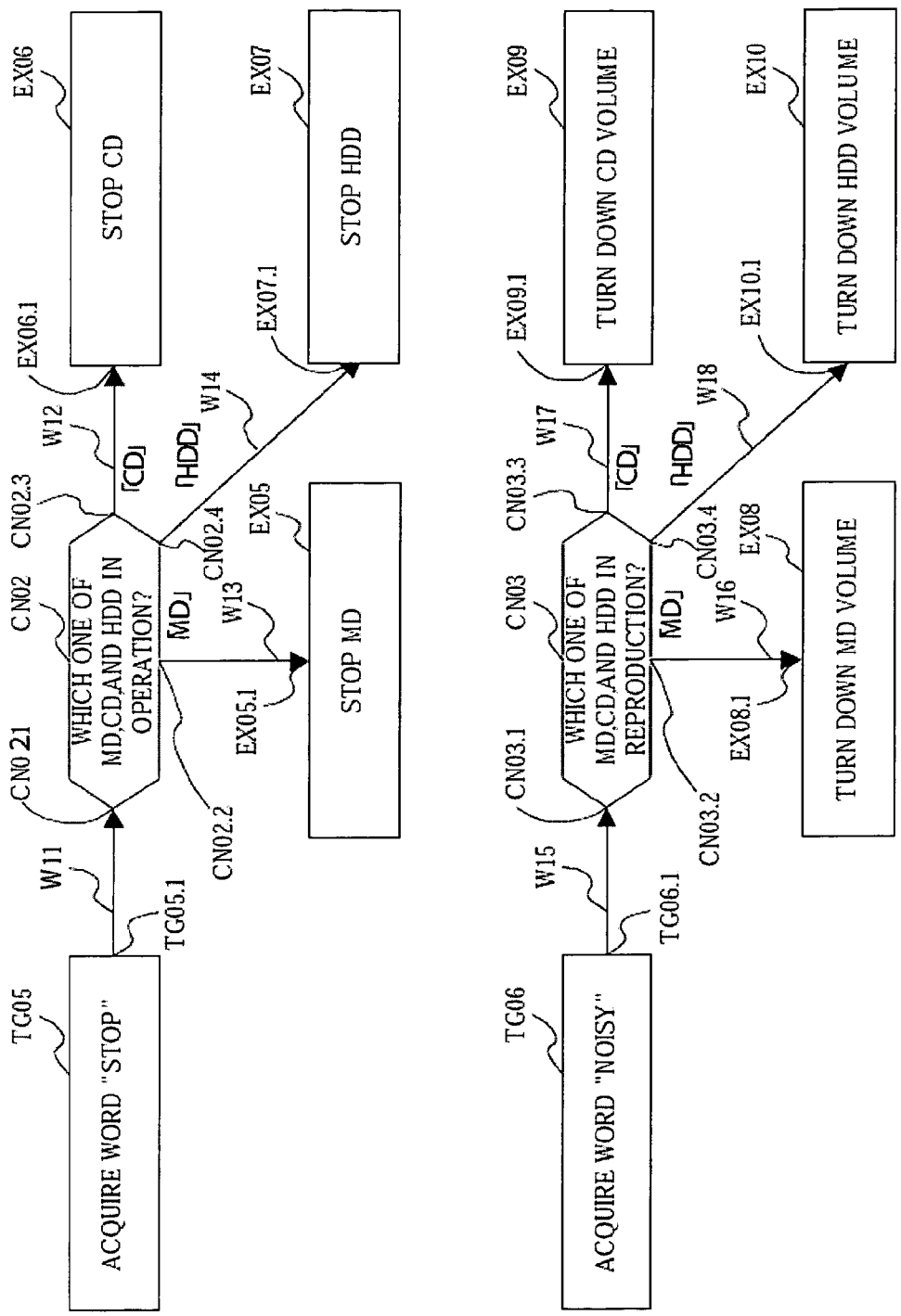
FIG. 11. A diagram showing a flow represented generally by the process item database and the wire database.

Next, in the flow shown in FIG. 11, the agent processing unit 6 stands by for word data indicating a word "stop" to be supplied from the language analyzer 2, acquires the data when supplied, and passes it to the discrimination process CN02 (wire W11).

In the discrimination process CN02, the agent processing unit 6 discriminates which one of the MD player 52, the CD player 51, and the HDD player 53 is in operation. When it is discriminated that "the MD player 52 is in operation", the agent processing unit 6 shifts a process to an input/output process EX05 (wire W13). In the input/output process EX05, a control signal which instructs stopping is output to the MD player 52. As a result, the MD player 52 stops its operation.

When it is discriminated that "the CD player is in operation" in the discrimination process CN02, the agent processing unit 6 shifts a process to an input/output process EX06 (wire W12). The agent processing unit 6 outputs a control signal instructing stopping to the CD player 51 in the input/output process EX05. As a result, the CD player 51 stops its operation.

When it is discriminated that "the HDD player 53 is in operation" in the discrimination process CN02, the agent processing unit 6 shifts a process to an input/output process EX07 (wire W14). The agent processing unit 6 outputs a control signal instructing stopping to the HDD player 53 in the input/output process EX07. As a result, the HDD player 53 stops its operation.

The agent processing unit 6 stands by for word data representing a word "noisy" to be supplied from the language analyzer 2 in a trigger process TG06, acquires the data when supplied, and passes it to a discrimination process CN03 (wire W15).

The agent processing unit 6 discriminates which one of the MD player 52, the CD player 51, the HDD player 53 is in reproduction operation. When it is discriminated that "the MD player 52 is in reproduction", a process progresses to an input/output process EX08 (wire W16). A control signal instructing turn-down of the volume is output to the MD player 52 in the input/output process EX08. As a result, the MD player 52 turns down the reproduction volume.

When it is discriminated that "the CD player 51 is in reproduction operation" in the discrimination process CN03, the agent processing unit 6 shifts a process to an input/output process EX09 (wire W17). In the input/output process EX09, a control signal instructing turn-down of the reproduction volume is output to the CD player 51. As a result, the CD player 51 turns down the reproduction volume.

When it is discriminated that "the HDD player 53 is in reproduction operation" in the discrimination process CN03, the agent processing unit 6 shifts a process to an input/output process EX10 (wire W18). In the input/output process EX10, a control signal instructing turn-down of the reproduction volume is output to the HDD player 53. As a result, the HDD player 53 turns down the reproduction volume.

Figure 12:
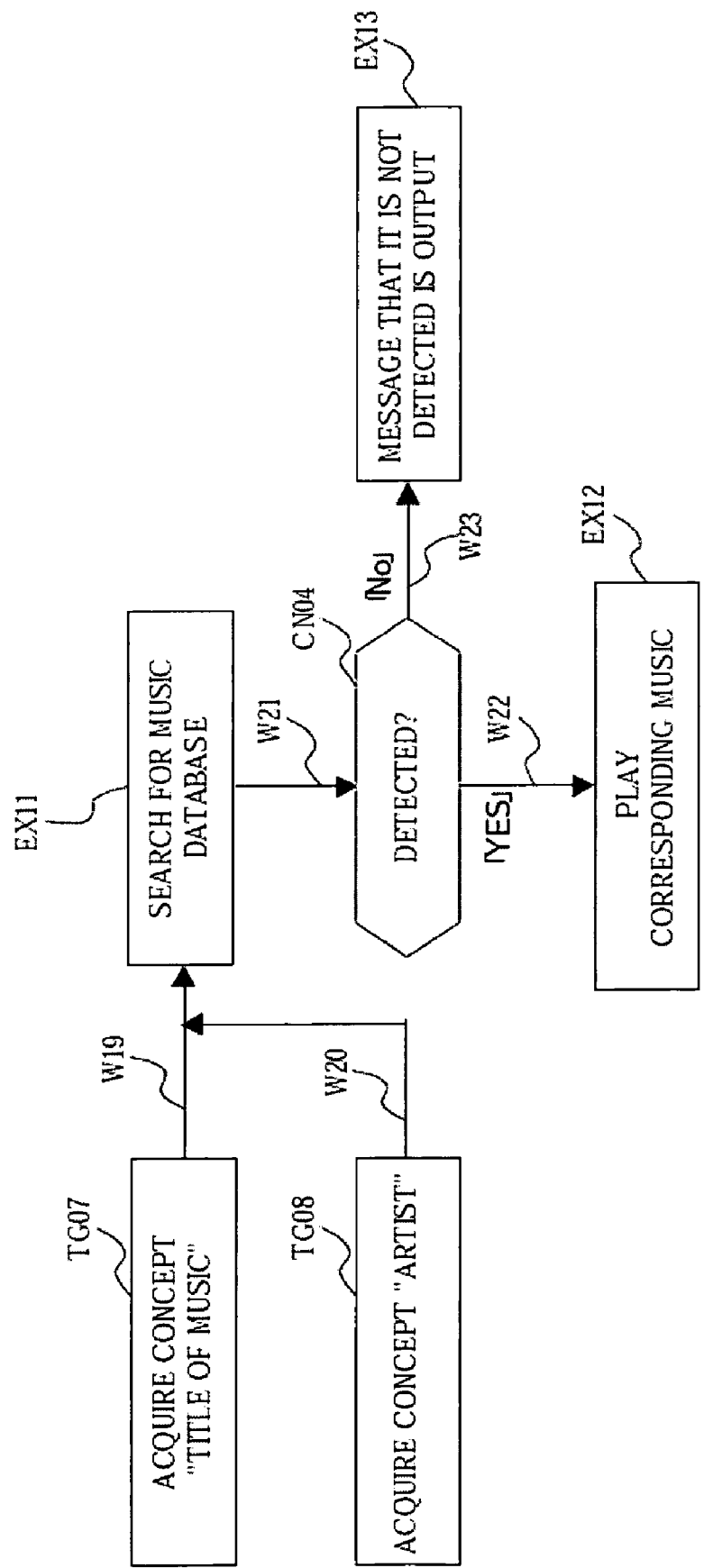
FIG. 12. A diagram showing a flow represented generally by the process item database and the wire database.

When word data representing the concept "title of a music piece" or the concept "artist name" is supplied from the language analyzer 2, the agent processing unit 6 detects these words in trigger acquisition processes TG07 and TG08 shown in FIG. 12, traces a wire W19 or W20, and shifts the control to an input/output process EX11.

The agent processing unit 6 searches the music database D6 in the input/output process EX11. That is, the agent processing unit 6 searches for the title of a music piece and an artist name in the data structure shown in FIG. 3A by words (title of a music piece or artist name) supplied from the language analyzer 2, and, if there is a corresponding one, the MD/CD/HDD identification information and the track number of a corresponding music piece are extracted.

When the search process is terminated, the agent controlling unit 6 traces a wire W21, shifts the control to a discrimination process CN04, and discriminates whether the corresponding music piece is detected or not.

If the corresponding music piece has been detected, the agent processing unit 6 traces a wire W22, shifts the control to an input/output process EX12, and reproduces the music piece.

If the music piece has not been detected, a wire W23 is traced and the control is shifted to an input/output process EX13, and a message that an appropriate music piece is not detected is output.

When the user utters "boring", it is possible to detect it and reproduce a music source that the user can have fun.

Figure 13:
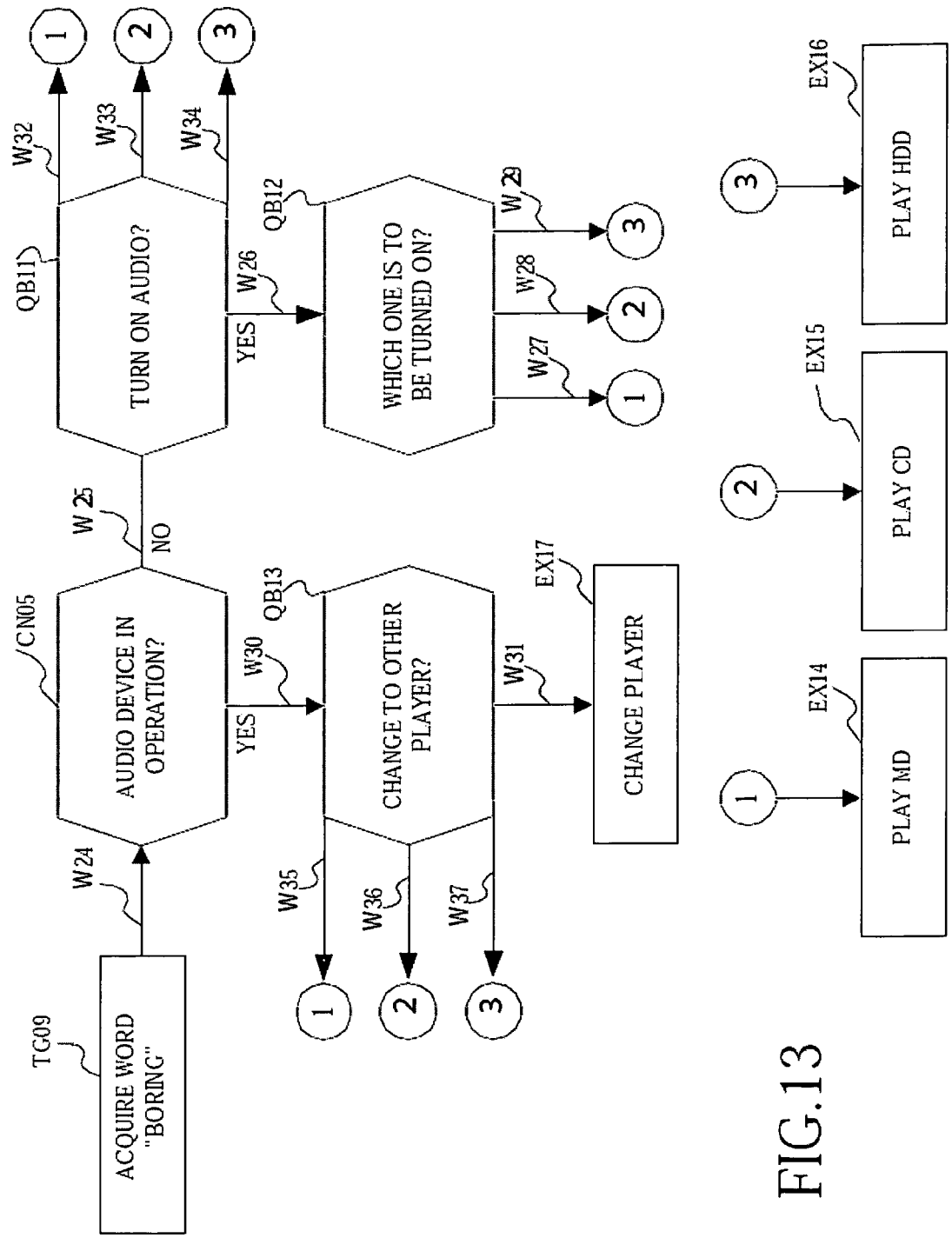
FIG. 13. A diagram showing a flow represented generally by the process item database and the wire database.

This example will be explained with reference to FIG. 13.

First, in a target process TG09, a word "boring" is stood by for. When it is detected, a wire W24 is traced, the statuses of the individual players 51 to 53 are checked in a discrimination process CN05, and it is discriminated whether the individual players 51 to 53 are performing reproduction operations. When none of the players 51 to 53 are performing operations, the flow proceeds to a discrimination process QB11 with an inquiry through a wire 25, and a message data "Turn on an audio?" is output through the speech synthesizing unit 3.

When there is a general reply like "sure" or "Yes", the flow proceeds to a discrimination process QB12 with an inquiry through a wire W26, and a message for specifying the player like "Which player should be turned on?" is output through the speech synthesizing unit 3.

If "MD", "CD", "HDD" or the like is uttered, the utterance thereof is detected, and the flow proceeds to input/output processes EX14, EX15, EX16 through wires W27, W28, W29, respectively, and the instructed MD, CD, or HDD is played.

In the discrimination process CN05, when it is discriminated that any of the players 51, 52, and 53 is performing operation, the flow proceeds to a discrimination process QB13 with an inquiry through a wire 30, and message data "Change to the other player?" is output through the speech synthesizing unit 3.

In a case where there is a general reply like simply "sure", "Yes", or the like, the flow proceeds to an input/output process EX17 through a wire W31, the player currently in reproduction operation is stopped, and the other player (for example, selected randomly) is started up.

In the input/output processes QB11, QB13 with inquiries, as words for specifying a specific player, such as "MD", "MD player", "CD", "CD player", "HDD", or "HDD player" are uttered, the uttered words are detected, and processes proceed to input/output processes EX14, EX15, EX16 through wires W32, W35, W33, W36, W34, W37, respectively, and the instructed MD, CD, or HDD is played.

In a case where plural pieces of music to be reproduced are retrieved in an arbitrary process, all of the plurality of corresponding music pieces may be reproduced, or music pieces to be reproduced may be selected in accordance with an arbitrary criteria based on arbitrary data acquired from the control target group 5.

The scheme of selecting an arbitrary music piece from plural pieces of music will now be explained with reference to FIG. 14A to FIG. 15B.

In the example in FIG. 14A, when plural pieces of music are retrieved in the discrimination process CN04 or the like, the agent processing unit 6 captures data on a running status of a vehicle from the vehicle location specifying unit 54 in the input/output process EX14, and discriminates the vehicular speed. Next, the agent processing unit 6 selects a music piece with a tempo corresponding to the traveling speed of the vehicle in the input/output process EX15, and reproduces the selected music piece in an input/output process EXxx. Accordingly, when the vehicle is traveling along, for example, a highway, an operation like selecting a music piece with a fast tempo, and reproducing it becomes possible.

In the example in FIG. 14B, when plural pieces of music are retrieved, the agent processing unit 6 captures data on the running status of the vehicle and map information from the vehicle location specifying unit 54 in the input/output process EX16, and discriminates the geographical characteristics of the current location (seaside, mountain, countryside, east, west, south, or north that the vehicle is directed, and the like). The agent processing unit 6 searches for a music piece having a title and attribution information matching the geographical characteristics in an input/output process EX17, and reproduces it in an input/output process EXxx. Accordingly, in running on a road along the sea, a music piece having an attribute associated with the environment is reproduced. This association may be made based on an image for a performer or the like, and a music piece including a word "wave", "sea", or the like in the title of the music piece may be selected.

In the example in FIG. 15A, when plural pieces of music are retrieved, the agent processing unit 6 captures data on the current date and time from the clock device 56 in an input/output process EX18, and discriminates the characteristics in the current time (spring, summer, autumn, winter, early summer, late autumn, . . . , morning, noon, early evening, night, and the like). The agent processing unit 6 searches for a music piece having a title and attribution information matching the characteristics in the current time in the input/output process EX19, and reproduces it in an input/output process EXxx.

In the example in FIG. 15B, when plural pieces of music are retrieved the agent processing unit 6 captures pitch information on a speaker from the language analyzer 2 in an input/output process EX20, refers to user information in the music database D6, and specifies the user.

Subsequently, the agent processing unit 6 specifies a music piece matching the favor of the speaker based on history information of the specified speaker in an input/output process EX21, and reproduces it in an input/output process EXxx.

The scheme of selecting a music piece matching the favor of a speaker is arbitral. For example, the category, artist, years or the like of a music piece repeatedly reproduced in the past may be discriminated, and a music piece corresponding to them may be selected.

When date data matching a predetermined condition is supplied from the clock device 56, the agent processing unit 6 may respond to this, establish connection to an external server over a network, download music data, and add the data in the music database D6.

The agent processing unit 6 may download data representing information to be notified to the user (release schedule of a product of a corresponding artist, or the like), and make the speech output unit 4 provide this information in the form of a speech through the speech synthesis processing unit 3.

In a case where a music piece corresponding to an artist or the title of a music piece requested by the user is not stored in the music database D6, connection may be established to an external server, a corresponding artist, music piece, or the like may be downloaded to the music database, and added in the music D6.

Prior to start of download, an inquiry message "the desired music piece is not currently stored, purchase and download?" may be output.

As word data representing an artist name is supplied from the language analyzer 2, the agent processing unit 6 responds to this, establish connection to a server of an external shopping site over a network, and make the speech output unit 4 utter a message for prompting reservation of a product through, for example, the speech synthesis processing unit 3 in the form of a speech, as a status where reservation procedure for the product of the corresponding artist is possible.

In a case where the language analyzer 2 supplies plural pieces of word data, for example, the agent processing unit 6 executes a plurality of discrimination processes in parallel. In this case, if there are a plurality of processes involving the same word as an input target (for example, data input in a trigger acquisition process or a discrimination process) and word data representing the corresponding word is supplied from the language analyzer 2, the agent processing unit 6 executes all of those processes in parallel.

Next, a method of calculating the weighting factors J of the individual wires will be explained.

In a case where a plurality of process are linked together by wires W, the weighting factor J of a wire W of interest is obtained by sequentially multiplying transition constants k for determining a progress direction over a transition path originating from a process currently in process as a start point to the wire W of interest.

To facilitate understanding, a process whose flow is illustrated in FIG. 16A is assumed.

In the general process in FIG. 16A, when a word "music" is entered, it is discriminated whether or not an audio device is in reproduction operation, and if not in reproduction operation, a speaker is asked whether to reproduce it or not, and a next process is executed in response to a reply.

In the process illustrated in FIG. 16A, for any of processes TG101, CN101, and QB101, the transition constants k for determining individual progress directions are all 0.5 in the forward direction, and are all 0.1 in the reverse (return) direction. In this case, wires are defined as illustrated in, for example, FIG. 16B.

For example, when a process (or control) is located at the trigger process TG101 (when a process pointer PP points the target process TG101), the agent processing unit 6 calculates the individual weighting factors J of wires W51 to W55 (all including non-illustrated wires if they are present) by sequentially multiplying transition constants k in the progress directions over a transition path with the trigger process TG101 being as a starting point, and writes calculation results in the wire database D5 in association with the wires W51 to W55.

Specifically, when the process reaches the trigger process TG101, the weighting factor J of the wire W51, for example, becomes the value of a transition constant k allocated to a node linked to the discrimination process CN101 of the trigger process TG11, i.e., 0.5.

The weighting factor J of the wire W52 in the discrimination process CN101 becomes equal to a resultant of multiplying a transition constant k=0.5 associated with the wire W51 in the trigger process TG101 by a transition constant k=0.5 allocated to a node linked to the wire W52 in the discrimination process CN101, i.e., 0.25. Likewise, the weighing factor J of the wire W54 in the discrimination process CN101 becomes equal to, a resultant of multiplying a transition constant k=0.5 allocated to a node linked to the wire W51 in the trigger process TG11 by a transition constant k=0.5 of a node linked to the wire W54 in the discrimination process CN101, i.e., 0.25.

The weighing factor J of the wire W53 becomes equal to a result of further multiplying a result of multiplication of the transition constant k=0.5 allocated to the node linked to the wire 51 in the trigger process TG101 by the transition constant k=0.5 allocated to the node linked to the wire W52 in the discrimination process CN11 by a transition constant k=0.5 allocated to a node linked to the wire W53 in the discrimination process QB101, i.e., 0.125. Likewise, the weighing factor J of the wire W53 becomes equal to a result of further multiplying a result of multiplication of the transition constant k=0.5 allocated to the node linked to the wire W51 in the trigger process TG11 by the transition constant k=0.5 allocated to the node linked to the wire W52 in the discrimination process CN101 by a transition constant k=0.5 allocated to a node linked to the wire W55 in the discrimination process QB101, i.e., 0.125.

Herewith, the weighting factors J of the individual wires with processes in process being as starting points are calculated. As the current status transitions, the weighting factors J of the individual wires W are calculated each time with current processes being as starting points.

Specifically, as the current process transitions to the discrimination process CN101, the weighting factor J of the wire W52 becomes a value 0.5 equal to the transition constant k allocated to the node linked to the wire W52, and the weighting factor J of the wire 54 becomes a value 0.5 equal to the transition constant k allocated to the node linked to the wire W52. The weighing factor J of the wire W53 becomes equal to the product of the transition constant k=0.5 allocated to the node linked to the wire W52 and the transition constant k=0.5 allocated to the node linked to the wire W55 in the discrimination process QB101, i.e., 0.25, and the weighing factor J of the wire W55 becomes equal to the product of the transition constant k=0.5 allocated to the node linked to the wire W52 and the transition constant k=0.5 allocated to the node linked to the wire W55 in the discrimination process QB101, i.e., 0.25. Further, the weighting factor J in the reverse direction (direction of returning to the trigger process TG101) becomes a value 0.1 equal to a transition constant k=0.1 of the reverse-direction node allocated to the node linked to the wire W51.

Further, as the process transitions to the discrimination process QB101, both of the weighting factors J of the wires W53 and W55 become a value 0.5 equal to transition constants k respectively allocated to the nodes linked to the wires W53 and W55.

Further, for the weighting factor J of the wire W52, a reverse-direction transition constant k=0.1 allocated to a reverse-direction node linked to it directly becomes the weighting factor J of the wire W52. Further, the weighting factor J of the wire W51 becomes 0.01 that is the product of a reverse-direction transition constant k=0.1 allocated to a node linked to the wire W52 in the discrimination process QB101 and a reverse-direction transition constant k=0.1 allocated to a reverse-direction node linked to the wire W51 in the discrimination process CN101. The weighting factor J of the wire W54 becomes 0.05 that is a product of the reverse-direction transition constant k=0.1 allocated to the node linked to the wire W52 in the discrimination process QB101 and a transition constant k=0.5 allocated to a node linked to the wire W54 in the discrimination process CN101.

Examples of changes in the weighting factors J of the individual wires Wn are illustrated in FIG. 15C.

Calculations of the weighting factors J are carried out not only for processes of the associated flow, but for all wires of the entire flows, and the calculated weighting factors J are set to the individual wires. A wire which is not associated with a current process may be allocated with a predetermined small count value. However, for a wire whose preceding process is a trigger acquisition process, the transition constant k is set high to some extent. This ensures a jump to a conversation whose contents greatly differ from the contents of a conversation that has been made just before.

Next, the operation of the entire system structured in this manner will be explained with reference to FIG. 17.

The speech input unit 1 and the language analyzer 2 individually operate, capture a speech, analyze it, and provide the agent processing unit 6 with word data.

When (one or plural pieces of) word data associated with discrimination conditions are supplied from the language analyzer 2, the agent processing unit 6 executes the following processes.

A supplied word is recognized (identified) (FIG. 17, step S11), and it is discriminated whether or not that word corresponds to a word registered in the word database D4 (step S12). If it is not registered (step S12, No), a word inputting process is terminated.

If it is registered (step S12, Yes), on the other hand, the product of the likelihood S of the word and the weighting factor J of the wire is calculated with respect to a process whose condition is the "concept" of the word or the group to which the word belongs (step S13).

For example, suppose that the process pointer PP indicates the trigger process TG101 in a case where the flow illustrated in FIG. 16A is being executed. The weighting factors J of the individual wires in this case are as illustrated in FIG. 16($c$-1).

Suppose that in this status, word data indicating a word "music" with a score of 80% and a word "reproduce" with a score of 50% are input from the language analyzer 2.

In the example illustrated in FIG. 16A and B, the word "music" relates to a discrimination condition in the trigger process TG101, and the word "reproduce" relates to a discrimination condition in the discrimination process QB101.

As illustrated in FIG. 16($c$-1), the weighting factor J of the wire W51 whose preceding process is a process of inputting the word data indicating the word "music" is 0.5, and the weighting factor J of the wire W53 whose preceding process is a process of inputting the word data indicating the word "reproduce" is 0.25. In this case, the products of the likelihoods (scores) S determined for the wires W51 and W53 and the weighting factors J are as indicated by equations 1 and 2.

Product $J \cdot S$ for wire $W51$: score $S$ of 80% for
"music"×weighting factor $J$ (=0.5) of wire
$W51$=40                                         (Equation 1)

Product $J \cdot S$ for wire $W53$: score $S$ of 50% for "reproduce"×weighting factor $J$ (=0.25) of wire
$W53$=12.5                                     (Equation 2)

The agent processing unit 6 carries out the above-described processes of determining the products of likelihoods (scores) of the individual words and weighting factors J for all the wires the flow has.

Figure 17:
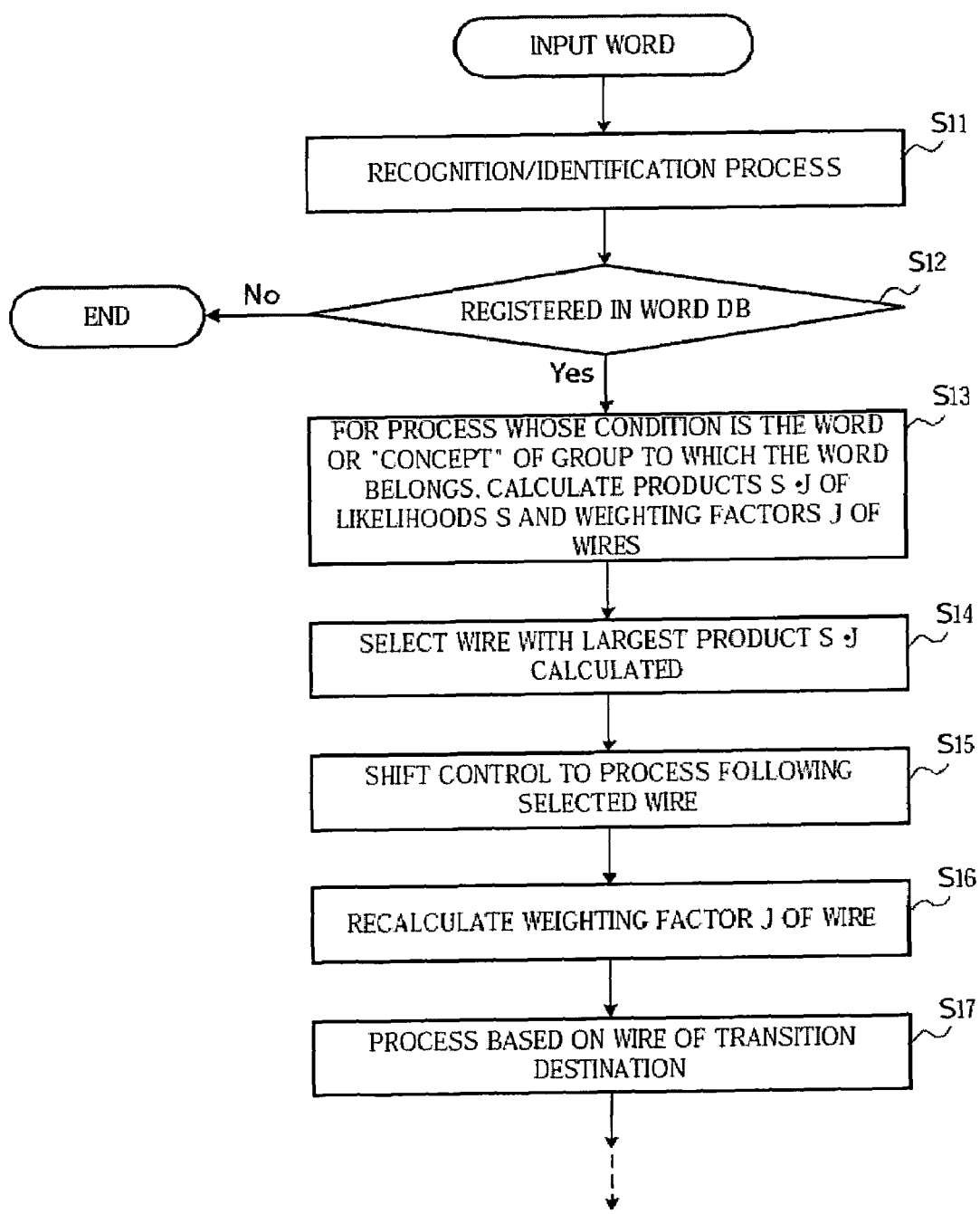
FIG. 17. A flowchart for explaining the operation of an agent processing unit.

Subsequently, the agent controlling unit 6 selects a wire with the largest calculated product J·S (FIG. 17, step S14). The agent controlling unit 6 shifts control to a process following the selected wire (step S15). For example, when the product acquired for the wire W51 represents the largest value, the input word data is recognized as representing the word "music", and transition takes place to the discrimination process CN11 which is the process following the wire W51. Normally, with a process currently in process being taken as a starting point, the weighting factor J of a wire is relatively large. Accordingly, the process generally shifts to the next process, but in a case where a word which quite differs from a previous one and has a large likelihood is input, a process corresponding to that word may start.

When the process transitions, the agent processing unit 6 recalculates the weighting factors J of the individual wires based on the status after transition (step S16).

Afterward, the process is carried out in accordance with the contents of the process (step S17). In this example, the discrimination process CN101 is executed. That is, the agent processing unit 6 acquires information on opening/closing of a window from the window opening/closing controller 54, determines the products of the likelihoods S of the wire W52 and wire W54 and weighting factors J based on the acquired information, determines the product J·S of the likelihood S of the wire W24 and the weighting factor J, selects some wire W, and executes a process following the selected wire W.

For a signal indicating opening/closing of the window from the window opening/closing controller 54, the likelihood of opening may be 100% or 0%, the likelihood of closing may be 0% or 100%, and they may be changed in accordance with the level of opening. When there is an input/output process EXxx during the process and the agent processing unit 6 executes this process and outputs speech data, it is generated as a speech, and as a process of controlling the input/output target group 5 is executed, control on the input/output target group 5 is performed according to the contents of the process.

A somewhat large transition constant k may be set for transition from a trigger acquisition process TGxx. Specifically, a weighting factor 0.9 or the like is given to, transition from the trigger acquisition process TGxx of acquiring a concept "reproduction" and words "stop", "noisy". Then, when input of the corresponding concept or the words are detected, the product J·S of a wire from the trigger acquisition process TGxx becomes large and is likely to be larger than the products of other wires, and, as a result, it becomes possible to cope with a request differing from the flow of a conversation.

In the embodiment, transition in the reverse direction may occur. However, it is often undesirable to reverse a conversation in practice. Accordingly, a reverse-direction transition constant k should be set to a smaller value than a preceding-direction transition constant k. Then, even if speech data with a high score is obtained from an input speech, a product acquired for a wire whose reverse-direction transition constant k is written as a weighting factor becomes a small value, so that the possibility of transition in the reverse direction can be suppressed at low.

The agent processing unit 6 may treat a process in which the value of the acquired product does not meet a predetermined condition (e.g., a process in which a product value does not reach a predetermined value) in such a way that the process is excluded from transition execution targets.

As illustrated in, for example, FIG. 9, a wire defines transition in the form of from a process item to a process item. As a wire is described in the form as illustrated in FIG. 8 and stored in the wire database D5, it is possible to define relationships among the individual process items as if they were macro processes of a computer. This can facilitate connection of the individual process items.

Because a process item to be a trigger actually becomes discrimination of the score of a word or the like (which may be an input from another input target group) to be recognized associated with a wire to be connected, a trigger process item in the wire is not defined as the starting point of the wire, but the wire itself is defined as the origin of transition.

Further, as the connection relationships among the individual process items are defined by wires, wires can be easily added. In a case where the user frequently inputs a speech "find a family restaurant" with an intention to take a rest after a speech "hot" is input, for example, a wire is automatically added with respect to the search process item of a family restaurant. Then, after the wire is automatically added, it becomes possible to appropriately cope with the input "find a family restaurant" by increasing the transition constant k of a wire connected to a family restaurant search process item to some extent (in this case, however, the agent processing unit 6 shall store map data or the like including, for example, information representing the location of a family restaurant, or access external map data or the like.

The automatic addition of a wire may be automatically carried out when the number of jumps from one process item to another is counted and reaches a predetermined number.

As mentioned above, the agent processing unit 6 has a function of updating the contents of the process item database D4 and the wire database D5 to externally supplied new process items and wires. Specifically, for example, as the contents of process item data and/or a wire stored in an external server is updated, the external server notifies the agent processing unit 6 over a network that the process item data and/or wire is updated. In response to the notification, the agent processing unit 6 accesses the server over the network, and downloads new process item data and/or a new wire. Old process item data and/or an old wire stored in the local process item database D4 and wire database D5 is updated to the downloaded new process item data and/or wire.

The agent processing unit 6 may access the external server, and download a database if it has been updated.

Figure 18:
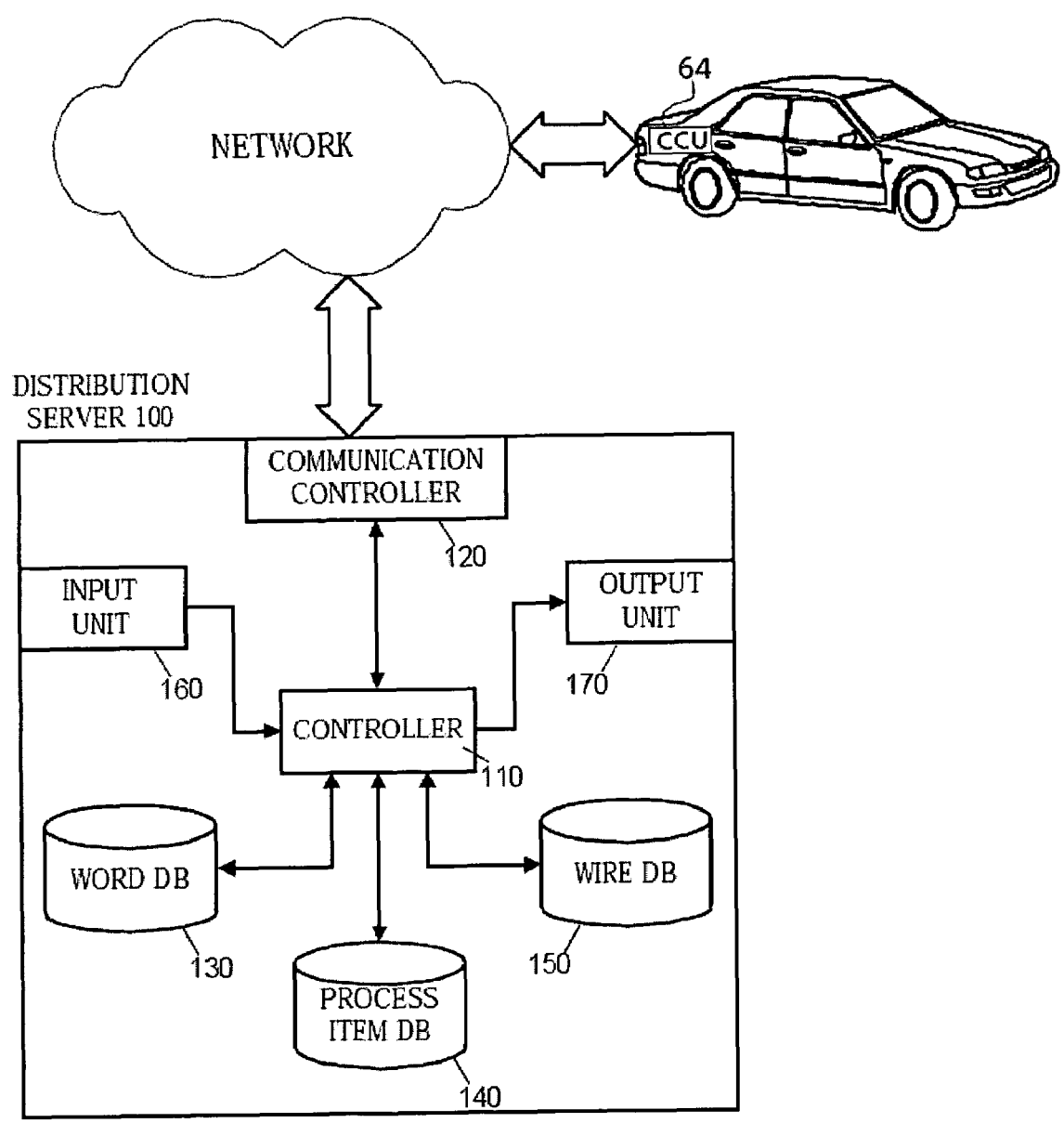
FIG. 18. A diagram showing the structure of an external server (distribution server) and a network structure.

An example of the structure of an external server will be illustrated in FIG. 18.

This external server 100, which distributes word data, process item data, and/or wire data to the agent processing units 6 of a plurality of vehicles over a communication network, comprises a controller 110, a communication controller 120, a word database 130, a process item database 140, a wire database 150, an input unit 160, and an output unit 170.

The controller 110 comprises, for example, a CPU (Central Processing Unit), controls the individual units of the distribution server 100, and realizes individual processes to be discussed later by running predetermined programs.

The communication controller 120 comprises, for example, a communication apparatus, such as a modem or a router, and controls communications between the distribution server 100 and the agent processing unit 6 (communication controller) of the vehicle over the network.

The structure of the network is optional. For example, a private line, a public line network, a cable television (CATV) network, a wireless communication network, a wire broadcasting network or the like can be employed.

The word database 130 comprises, for example, a rewritable storage device like a hard disk drive, and stores word data distributed by the distribution server 100 together with version information (for example, time stamp).

The process item database 140 comprises, for example, a rewritable storage device like a hard disk drive, and stores process item data to be distributed, together with version information (for example, time stamp).

The wire database 150 comprises, for example, a rewritable storage device like a hard disk drive, and stores wire data to be distributed, together with version information (for example, time stamp).

The manager of the distribution server 100 properly manipulates the input unit 160, and updates information in the individual DBs 130 to 150.

Upon reception of an update notification from the distribution server 100 through the communication controller (CCU) 64, the agent processing unit 6 of each vehicle starts, for example, a process in FIG. 19A and establishes a session (step S21), downloads updated data, and updates local databases (step S22). Or, the agent processing unit 6 of each vehicle regularly or properly accesses the distribution server 100 through the communication controller (CCU) 64 and establishes a session (step S31), and acquires the version information (update date or the like) of each database (step S32). It compares the versions of both data with each other (step S33), downloads data newer than data locally stored, and sets the data in the database (step S34).

Employment of such a structure ensures appropriate update of data of all vehicle control systems which can use the distribution server 100 by merely updating information recorded in the distribution server 100.

It is desirable that the distribution server 100 should store data compressed and encrypted, and the agent processing unit 6 should download the data, expand and decrypt the data, and set the data in the database. This suppresses communication traffic, and prevents information leakage.

The timing when the agent processing unit 6 downloads data from the distribution server 100 is not limited to the aforementioned example, but arbitrary, and in a case where process item and/or a wire both corresponding to the user's request is not stored, for example, the agent processing unit may detect that, access the distribution server 100 over the network, and download new process item data and/or a new wire. Further, in a case where an input/output target device group 5 to be connected to the agent processing unit 6 is newly added or a new function is added, the agent processing unit may automatically detect that, access the distribution server 100 over the network, and download the new process item data and/or wire in such a manner as described above.

The agent processing unit 6 has a function of automatically creating a new wire, and may download a new process item together with a program describing what relationship a wire to be set has with respect to the downloaded new process item and an existing process item.

If data and a wire representing the contents of a process are described appropriately, the above-described audio system need not completely specify a device to be controlled and the contents of control to be added, but can respond to a language spoken by the user, assume the demand of the user from the language, appropriately determine what control should be applied to which device to meet the demand, and apply control according to the result of the discrimination to a device.

Because process item data and a wire are updated to new ones at any time, there is always room for changing how the agent processing unit 6 responds, so that the user is not likely to get bored with interaction with the audio system.

The structure of the audio system is not limited to the above-described one.

For example, devices belonging to the input/output target device group 5 should not necessarily be devices which bring about a result directly satisfying the user's demand, and may comprise, for example, a device (e.g., a display apparatus like a liquid crystal display) that controls an external display apparatus or the like which outputs a message for prompting the user to take a specific action.

The word database may store not only data representing a word, but also data representing a phrase of plural words, as an element of the word database, or may store data representing a part of a word or a phoneme, as an element of the word database. A word or the like should not necessarily be grouped under a specific concept, and even in a case where grouping is done, data to be used for carrying out grouping may not take the form of a set of flags.

The agent processing unit 6 may change a transition constant k described in a wire in accordance with a predetermined rule based on the number of times a transition represented by the wire has been executed, and rewrite the transition constant k allocated to a wire (node to be a starting point of a wire) in such a way that the transition constant k becomes the value after the change.

Specifically, for example, the wire database stores the number of executions of a transition represented by each wire, with respect to that wire. The agent processing unit 6 rewrites the value of the number every time the transition is newly executed, thereby incrementing the value of the number by 1, and rewrites the transition constant k written in each wire to a value which is proportional to, for example, the number stored for the wire.

The agent processing unit 6 may change data to be output in a discrimination process and an input/output process in accordance with data passed to those processes, data input through those processes, and other optional conditions.

The audio system may have a display apparatus (for example, a liquid crystal display or the like) for outputting an image under the control of the agent processing unit 6, and the agent processing unit 6 may control the display apparatus in such a way that it displays a predetermined image for each process in the input/output process and the discrimination process.

The agent processing unit 6 may collectively acquire plural pieces of word data continuously spoken or the like in one input process and one discrimination process. The agent processing unit 6 may specify under what concept plural pieces of word data collectively acquired are grouped to the same group, and use a piece of or all of the acquired word data for use in a process only if the specified concept matches the predetermined concept.

The agent processing unit 6 may comprise a plurality of data processing units (e.g., computers or the like) which are connected to one another and bear a flow formed generally by various processes, such as a trigger acquisition process, a discrimination process, and an input/output process, and wires. In this case, it is sufficient that each data processing unit which constitutes an analysis processing unit 3 stores data representing that portion in the overall flow executable by the analysis processing unit 3 which is probably executed by the unit, as elements of the process item database or the wire database. If data to be stored by each data processing unit is such data which macro-defines that process which is executed by the data processing unit, it is easy to cause a plurality of data processing units to perform distributed processing.

The car audio system may plurally include the speech input units 1, and the language analyzers 2 or the speech output units 4.

The speech input unit 1 may have a recording medium drive unit (e.g., a floppy (registered trademark) disk drive, a CD-ROM drive or an MO drive) which reads a waveform signal from a recording medium (e.g., a floppy (registered trademark) disk, a CD, an MO (Magneto-Optical Disk)) where data representing speeches is recorded, and supplies the signal to the language analyzer 2.

The language analyzer 2 may specify a speaker (or the gender of the speaker) of speeches represented by speech data supplied from the speech input unit 1, and supply the agent processing unit 3 with speaker data representing the specified speaker. Every time the agent processing unit 3 instructs to reproduce a music piece, it may add history data representing that the music piece to be reproduced is reproduced for the speaker represented by the speaker data on the music database (or, data representing the number of reproductions of the music piece for the speaker may be stored as history data, and the history data may be incremented by 1). In case of selecting a music piece to be reproduced, the music piece may be selected based on the history data.

An audio device control device according to the invention whose embodiment has been explained above can be realized not only by an exclusive system but also an ordinary computer system.

For example, the car audio system that executes the above-described processes can be constructed by installing a program for executing the operations of the speech input unit 1, language analyzer 2, speech synthesis processing unit 3, speech output unit 4 and agent processing unit 6 into a personal computer connected to the input/output target device group 5 and a communication control device from a recording medium where the program is stored. The personal computer that executes the program executes flows shown in FIG. 16 as processes equivalent to the operation of the car audio system in FIG. 1.

The program that allows a personal computer to perform the functions of the car audio system may be uploaded to, for example, a bulletin board system (BBS) of a communication line, and distributed via the communication line, or a carrier may be modulated with a signal representing the program, the acquired modulated wave may be transmitted, and a device which receives the modulated wave demodulates the modulated wave to restore the program. Then, the above-described processes can be executed by invoking the program, and running the program like other application programs under the control of the OS.

When the OS bears a part of the processes, or the OS constitutes a part of a single constituting element of the invention, a program excluding that part may be stored in a recording medium. In this case, it is also assumed that according to the invention, a program for executing the individual functions or steps to be executed by the computer is stored in the recording medium.

What is claimed is:

1. An audio device control device for controlling an audio device for reproducing music comprising:

music specification information storing means which stores specification information for specifying the music in advance;

constant storing means which stores a phrase and a predetermined constant in association with one another in advance;

speech recognition means which acquires speech data representing a speech, and specifies a candidate for a phrase included in said speech by performing speech recognition on said speech data, and calculates likelihood for each of the candidate of the specified phrase;

operational status information acquisition means which acquires operational status information indicating an operational status of the audio device to be controlled; and audio device control means which calculates a parameter for specifying music based on the predetermined constant corresponding to the phrase specified by the speech recognition means and the likelihood calculated by the speech recognition means, specifies music reproduced by the audio device based on the operational status acquired by said operational status information acquisition means and on the calculated parameter; and controls said audio device for reproducing the specified music.

2. The audio device control device according to claim 1, further comprising:

environmental information acquisition means which acquires environmental data indicating environmental circumstances in which an external audio device is employed; and wherein the audio device control means specifies music reproduced by the audio device based on the environmental data acquired by the environmental information acquisition means.

3. The audio device control device according to claim 2, wherein said environmental data comprises data indicating a current location of the audio device or data indicating a sound insulation circumstance of the environment under which said audio device is used.

4. The audio device control device according to claim 2, further comprising:
 map storing means which stores map information in advance; and
 location acquisition means which acquires current location of the audio device,
 wherein the music discrimination information storing means stores specification information for specifying the music and geographical characteristics in association with one another; and
 the audio device control means acquires the environmental data indicating geographical characteristics of the current location based on the stored map information and the acquired current location, and specifies music indicated by specification information corresponding to the acquired geographical characteristics as music reproduced by the audio device.

5. The audio device control device according to claim 2, further comprising:
 time acquisition means for acquiring the current time; and
 wherein the music discrimination information storing means stores discrimination information for discrimination the music and time characteristics with corresponding to with respect to one another; and
 the audio device control means acquires the environmental data indicating time characteristics including the current time, and specifies music indicated by specification information corresponding to the acquired time characteristics as music reproduced by the audio device.

6. The audio device control device according to claim 1, further comprising:
 utterer specification means which specifies an utterer of said speech or an attribute of the utterer based on said speech data acquired by the speech recognition means; and
 wherein the audio device control means specifies music reproduced by the audio device based on the utterer or on the attribute of the utterer both specified by the utterer specification means.

7. The audio device control device according to claim 6,
 wherein the music discrimination information storing means stores history information indicating history of music reproduced by the audio device and user information specifying a user with corresponding to with respect one another; and
 the audio device control means specifies music reproduced by the audio device based on history information corresponding to the utterer or an attribute of the utterer both specified by the utterer specification means.

8. The audio device control device according to claim 6,
 wherein the history information which includes at least one of the genre of the reproduced music, the artist of the reproduced music, and the date of the reproduced music.

9. The audio device control device according to claim 1,
 wherein the audio device control means calculates the parameter represented by product given by the predetermined constant multiplied by the likelihood and specifies music reproduced by the audio device based on the phrase candidate corresponding to the largest parameter.

10. The audio device control device according to claim 1,
 wherein the audio device includes a plurality of reproduction means for reproducing music; and
 the audio device control means specifies music reproduced by the audio device based on the operational status indicating as to which reproduction means of the plurality of reproduction means is employed by the audio device for present reproduction.

11. The audio device control device according to claim 1, comprising:
 the music discrimination information storing means which stores discrimination information for discriminating the music and at least one of music title and artist title in association with one another; and
 the audio device control means specifies music title or artist title including a phrase specified by the speech recognition means and controls the audio device in such a way as to reproduce music corresponding to the specified music title or the specified artist title.

12. An audio device control method for controlling an audio device reproducing music, comprising:
 a speech recognition step of acquiring speech data representing a speech, specifying a candidate for a phrase included in said speech by performing speech recognition on said speech data, and calculating likelihood for each of the candidate of the specified phrase;
 an operational status acquisition step of acquiring an operational status of an audio device to be controlled; and
 an audio device control step of calculating a parameter for specifying music based on a predetermined constant corresponding to the phrase specified the speech recognition step in advance and on the likelihood calculated by the speech recognition means, specifying music reproduced by the audio device based on the operational status acquired by the operational status information acquisition step and on the calculated parameter, and controlling said audio device in such a way as to reproduce the specified music.

13. A computer-readable recording medium storing a computer program that allows a computer for controlling an audio device for reproducing music to execute:
 a speech recognition step of acquiring speech data representing a speech, and specifying a candidate for a phrase included in said speech by performing speech recognition on said speech data, and calculating likelihood for each of the candidate of the specified phrase;
 an operational status acquisition step of acquiring an operational status of an audio device to be controlled; and
 an audio device control step of calculating a parameter for specifying music based on a predetermined constant corresponding to the phrase specified by the speech recognition step in advance and on the likelihood calculated by the speech recognition means, specifying music reproduced by the audio device based on the operational status acquired by the operational status information acquisition step and on the calculated parameter, and controlling said audio device in such a way as to reproduce the specified music.

* * * * *